United States Patent
Jang et al.

(10) Patent No.: US 11,071,429 B2
(45) Date of Patent: Jul. 27, 2021

(54) ROBOT CLEANER

(71) Applicant: LG ELECTRONICS INC., Seoul (KR)

(72) Inventors: Jaewon Jang, Seoul (KR); Jeongseop Park, Seoul (KR); Youngkouk Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 16/333,108

(22) PCT Filed: Jul. 14, 2017

(86) PCT No.: PCT/KR2017/007550
§ 371 (c)(1),
(2) Date: Mar. 13, 2019

(87) PCT Pub. No.: WO2018/012913
PCT Pub. Date: Jan. 18, 2018

(65) Prior Publication Data
US 2019/0223675 A1    Jul. 25, 2019

Related U.S. Application Data

(60) Provisional application No. 62/362,358, filed on Jul. 14, 2016.

(51) Int. Cl.
*A47L 11/24* (2006.01)
*A47L 11/283* (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC .......... A47L 11/14; A47L 11/16; A47L 11/24; A47L 11/283; A47L 11/293; A47L 11/40;
(Continued)

(56) References Cited

U.S. PATENT DOCUMENTS 3,381,334 A   5/1968 Redmond
3,827,099 A   8/1974 Allaire et al.
(Continued)

FOREIGN PATENT DOCUMENTS

CN   1823677      8/2006
CN   2817718 U    9/2006
(Continued)

OTHER PUBLICATIONS

PCT Search Report dated Nov. 20, 2017, on PCT International Patent Application No. PCT/KR2017/007551.
(Continued)

*Primary Examiner* — Randall E Chin
(74) *Attorney, Agent, or Firm* — Finnegan, Henderson, Farabow, Garrett & Dunner, LLP

(57) ABSTRACT

A robot cleaner includes a main body forming an external appearance of the robot cleaner, moving units configured to move the main body, a cleaning module arranged at one side of the main body so as to contact a floor and rotated, a module driving unit arranged in the main body and rotating the cleaning module, and a dust pocket configured to remove foreign substances attached to the outer circumference of the cleaning module.

12 Claims, 29 Drawing Sheets

(51) Int. Cl.
| | |
|---|---|
| A47L 11/40 | (2006.01) |
| A47L 11/293 | (2006.01) |
| A47L 11/14 | (2006.01) |
| A47L 11/282 | (2006.01) |
| B08B 3/04 | (2006.01) |
| B08B 3/08 | (2006.01) |
| A47L 11/292 | (2006.01) |
| A47L 11/16 | (2006.01) |
| A47L 11/34 | (2006.01) |
| B25J 9/16 | (2006.01) |
| B25J 11/00 | (2006.01) |
| G05D 1/02 | (2020.01) |
| A47L 9/00 | (2006.01) |
| A47L 9/06 | (2006.01) |
| A47L 11/20 | (2006.01) |
| B25J 5/00 | (2006.01) |
| B25J 9/00 | (2006.01) |
| B25J 9/12 | (2006.01) |
| A47L 13/20 | (2006.01) |
| B08B 1/04 | (2006.01) |
| A47L 9/28 | (2006.01) |

(52) U.S. Cl.
CPC ............ *A47L 9/2826* (2013.01); *A47L 9/2852*
(2013.01); *A47L 11/14* (2013.01); *A47L 11/16*
(2013.01); *A47L 11/161* (2013.01); *A47L
11/20* (2013.01); *A47L 11/201* (2013.01);
*A47L 11/24* (2013.01); *A47L 11/282*
(2013.01); *A47L 11/292* (2013.01); *A47L
11/293* (2013.01); *A47L 11/34* (2013.01);
*A47L 11/40* (2013.01); *A47L 11/4002*
(2013.01); *A47L 11/4005* (2013.01); *A47L
11/405* (2013.01); *A47L 11/408* (2013.01);
*A47L 11/4011* (2013.01); *A47L 11/4013*
(2013.01); *A47L 11/4038* (2013.01); *A47L
11/4058* (2013.01); *A47L 11/4061* (2013.01);
*A47L 11/4066* (2013.01); *A47L 11/4069*
(2013.01); *A47L 11/4072* (2013.01); *A47L
11/4083* (2013.01); *A47L 11/4088* (2013.01);
*A47L 13/20* (2013.01); *B08B 1/04* (2013.01);
*B08B 3/041* (2013.01); *B08B 3/08* (2013.01);
*B25J 5/007* (2013.01); *B25J 9/0003*
(2013.01); *B25J 9/126* (2013.01); *B25J
9/1664* (2013.01); *B25J 9/1666* (2013.01);
*B25J 11/0085* (2013.01); *G05D 1/0223*
(2013.01); *A47L 2201/00* (2013.01); *A47L
2201/04* (2013.01); *A47L 2201/06* (2013.01);
*G05D 2201/0203* (2013.01)

(58) Field of Classification Search
CPC .............. A47L 11/4013; A47L 11/4038; A47L
11/4066; A47L 11/4069; A47L 2201/024;
B25J 11/0085
See application file for complete search history.

(56) References Cited

U.S. PATENT DOCUMENTS

| | | | |
|---|---|---|---|
| 4,418,342 A | 11/1983 | Aschoff et al. | |
| 5,991,951 A | 11/1999 | Kubo et al. | |
| 6,493,896 B1 | 12/2002 | Stuchlik et al. | |
| 7,320,149 B1 | 1/2008 | Huffman et al. | |
| 9,814,364 B1* | 11/2017 | Caruso | A47L 11/33 |
| 2004/0163199 A1 | 8/2004 | Hsu | |
| 2004/0221474 A1 | 11/2004 | Slutsky et al. | |
| 2005/0015913 A1 | 1/2005 | Kim et al. | |
| 2005/0166356 A1 | 8/2005 | Uehigashi | |
| 2005/0183230 A1 | 8/2005 | Uehigashi | |
| 2006/0185690 A1* | 8/2006 | Song | A47L 11/34 134/21 |
| 2007/0261715 A1 | 11/2007 | Lee et al. | |
| 2010/0031463 A1 | 2/2010 | Adams et al. | |
| 2012/0084938 A1 | 4/2012 | Fu | |
| 2012/0125363 A1 | 5/2012 | Kim et al. | |
| 2013/0096717 A1 | 4/2013 | Yoon et al. | |
| 2013/0263889 A1 | 10/2013 | Yoon et al. | |
| 2014/0130289 A1 | 5/2014 | Hyun et al. | |
| 2014/0209122 A1 | 7/2014 | Jung et al. | |
| 2015/0142169 A1 | 5/2015 | Kim et al. | |
| 2015/0143646 A1 | 5/2015 | Jeong et al. | |
| 2015/0150429 A1 | 6/2015 | Yoo et al. | |
| 2015/0182090 A1 | 7/2015 | Park et al. | |
| 2015/0196183 A1 | 7/2015 | Clark et al. | |
| 2016/0022109 A1 | 1/2016 | Dooley et al. | |
| 2016/0051108 A1 | 2/2016 | Huang et al. | |
| 2018/0120833 A1 | 5/2018 | Lindhe et al. | |
| 2019/0270124 A1 | 9/2019 | Jang et al. | |

FOREIGN PATENT DOCUMENTS

| | | |
|---|---|---|
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 103006153 | 4/2013 |
| CN | 203113255 U | 8/2013 |
| CN | 203296009 U | 11/2013 |
| CN | 103717117 A | 4/2014 |
| CN | 104244794 A | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 2702918 A1 | 3/2014 |
| EP | 2762051 A2 | 8/2014 |
| EP | 3485785 | 5/2019 |
| JP | H05-300860 | 11/1993 |
| JP | H11-178764 | 7/1999 |
| JP | 2000-051128 | 2/2000 |
| JP | 2000070203 A | 3/2000 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |
| KR | 20-0435111 U | 1/2007 |
| KR | 10-0822785 | 4/2008 |
| KR | 10-2009-0026031 | 3/2009 |
| KR | 10-20090086657 | 8/2009 |
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |
| KR | 20-2012-0002399 U | 4/2012 |
| KR | 10-2012-0042391 | 5/2012 |
| KR | 10-2012-0055891 | 6/2012 |
| KR | 10-2012-0100682 | 9/2012 |
| KR | 10-20130042423 | 4/2013 |
| KR | 10-1303159 | 9/2013 |
| KR | 10-2013-0129059 | 11/2013 |
| KR | 10-20140022472 | 2/2014 |
| KR | 10-2015-0014351 | 2/2015 |

(56) References Cited

FOREIGN PATENT DOCUMENTS

| KR | 10-2015-0022133 | 3/2015 |
|---|---|---|
| KR | 10-2015-0031821 | 3/2015 |
| KR | 10-2015-0048490 | 5/2015 |
| KR | 10-2015-0057959 | 5/2015 |
| KR | 10-1522177 | 5/2015 |
| KR | 10-2015-0060030 | 6/2015 |
| KR | 10-20150078094 | 7/2015 |
| KR | 10-2015-0107396 | 9/2015 |
| KR | 10-2015-0107693 | 9/2015 |
| KR | 10-20150107693 | 9/2015 |
| KR | 10-2015-0116311 | 10/2015 |
| KR | 10-1569058 | 11/2015 |
| KR | 10-2015-0139111 | 12/2015 |
| KR | 10-1578887 | 12/2015 |
| KR | 10-1595727 | 2/2016 |
| KR | 10-20160033615 | 3/2016 |
| KR | 10-2016-0090570 | 8/2016 |
| KR | 10-2016-0104429 | 9/2016 |
| KR | 10-2016-0122520 | 10/2016 |
| KR | 10-1678443 | 12/2016 |
| KR | 10-2018-0105109 | 9/2018 |
| TW | 537326 U | 6/2003 |
| TW | M455464 | 6/2013 |
| WO | WO 2015/186944 A1 | 12/2015 |
| WO | WO 2016/027957 | 2/2016 |
| WO | WO 2016/036183 A1 | 3/2016 |

OTHER PUBLICATIONS

European Search Report dated Mar. 31, 2020, on European Patent Application No. 17827982.4.
European Search Report dated May 4, 2020, on European Patent Application No. 17827984.0.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
Taiwan Office Action dated Oct. 30, 2018, on Taiwan Patent Application No. 107101299.
Korean Office Action dated Apr. 23, 2020, on Korean Patent Application No. 10-2018-7036043.
Korean Notice of Allowance dated Apr. 28, 2020, on Korean Patent Application No. 10-2018-7036042.
Korean Notice of Allowance dated Apr. 29, 2020, on Korean Patent Application No. 10-2018-7036039.
Taiwan Office Action dated May 22, 2020, on Taiwan Patent Application No. 107101298.
European Search Report dated May 26, 2020, on European Patent Application No. 17827993.1.
European Search Report dated May 26, 2020, on European Patent Application No. 17827985.7.
Korean Notice of Allowance dated Jul. 1, 2020, on Korean Patent Application No. 10-2018-7036041.
U.S. Office Action dated Jul. 15, 2020, on U.S. Appl. No. 16/333,129.
Chinese Office Action dated Jul. 22, 2020, on Chinese Patent Applicatuin Ni, 201780056575.7.
Chinese Office Action dated Aug. 3, 2020, on Chinese Patent Application No. 201780056675.X.
European Search Report dated Aug. 13, 2020, on European Patent Application No. 17827983.2.
Korean Office Action dated Aug. 19, 2020, on Korean Patent Application No. 10-2020-7014910.
Chinese Office Action dated Sep. 21, 2020 on Chinese Patent Application No. 201780056578.0.
EP Search Report dated Aug. 14, 2020.
U.S. Office Action dated Sep. 21, 2020 on U.S. Appl. No. 16/333,138.
U.S. Office Action dated Oct. 6, 2020 on U.S. Appl. No. 16/333,124.
U.S. Office Action dated Oct. 9, 2020 on U.S. Appl. No. 16/333,135.
PCT Search Report dated Sep. 28, 2017, on PCT International Patent appl. No. PCT/KR2017/007549.
PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Taiwan Office Action dated Dec. 18, 2018, on Taiwan Patent appl. No. 107101303.
Taiwan Office Action dated Dec. 25, 2018, on Taiwan Patent appl. No. 107101297.
Taiwan Office Action dated Sep. 18, 2019, on Taiwan Patent appl. No. 107101298.
Korean Notice of Allowance dated Jun. 17, 2019, on Korean Patent appl. No. 10-2018-0110855.
Korean Notice of Allowance dated Jun. 29, 2018, on Korean Patent appl. No. 10-2017-0009364.
Australian Office Action dated Jul. 16, 2019, on Australian Patent appl. No. 2017297104.
Korean Notice of Allowance dated Jun. 29, 2018, on Korean Patent Application No. 10-2017-0009364.
Korean Notice of Allowance dated Jun. 17, 2019, on Korean Patent Application No. 10-2018-0110855.
Taiwan Office Action dated Dec. 24, 2018, on Taiwan Patent Application No. 107101298.

* cited by examiner

ROBOT CLEANER

CROSS-REFERENCE TO RELATED APPLICATIONS

This application is a U.S. National Phase entry under 35 U.S.C. § 371 from PCT International Application No. PCT/KR2017/007550, filed Jul. 14, 2017, which claims the benefit of priority of U.S. Provisional Application No. 62/362,358, filed Jul. 14, 2016, the contents of which are incorporated herein by reference in their entireties.

BACKGROUND OF THE INVENTION

1. Field of the Invention

The present invention relates to a robot cleaner and, more particularly, to a robot cleaner to which a cleaning module is detachably attached.

2. Description of the Related Art

Recently, robots tend to be increasingly used in homes. As a representative example of such robots, there is a robot cleaner. The robot cleaner, which is a kind of mobile robot, may automatically clean a space to be cleaned by sucking foreign substances, such as dust, etc. from the floor while autonomously travelling in a designated area, or clean the space by wiping the floor using a rotating mop while moving using the rotating mop.

The rotating mop of the robot cleaner may use a spinning mop which forms a rotary shaft approximately vertical to the floor, or a rolling mop which forms a rotary shaft horizontal to the floor. However, if the rolling mop is used, the rolling mop is rotated while contacting the floor and, thus, dust of the floor, etc. are attached to the outer circumference of the rolling mop and it is difficult to clean a large area.

Further, if the rolling mop, both sides of the rotary shaft of which are fixed, is used, it is not easy to attach and detach a dustcloth to and from the rolling mop and it is not easy to replace the dustcloth with a new one.

DISCLOSURE

Technical Problem

An object of the present invention is to provide a robot cleaner in which a replacement cycle of a cleaning module is increased through operation.

Another object of the present invention is to provide a robot cleaner provided with a cleaning module which is easily replaceable.

Yet another object of the present invention is to provide a robot cleaner which may use various cleaning modules.

The objects of the present invention are not limited to the above-mentioned objects and other objects that have not been mentioned above will become evident to those skilled in the art from the following description.

Technical Solution

To achieve the above objects, there is provided a robot cleaner including a main body forming an external appearance of the robot cleaner, moving units configured to move the main body, a cleaning module arranged at one side of the main body so as to contact a floor and rotated, a module driving unit arranged in the main body and rotating the cleaning module, and a dust pocket configured to contain foreign substances moved by the cleaning module, so as to remove foreign substances attached to the cleaning module during an operation process of the robot cleaner.

The cleaning module of the robot cleaner may include a rotational member connected to the module driving unit so as to be rotated, and a cleaning member arranged along an outer circumference of the rotational member and contacting a floor surface, and the cleaning member may clean the floor by contact of an outer circumference of the cleaning member with the floor.

The dust pocket of the robot cleaner may include an opening through which foreign substances attached to the outer circumference of the cleaning member is introduced into the dust pocket, and the opening may be open in the upward direction within the module housing so that foreign substances attached to the outer circumference of the cleaning member may be easily introduced into the dust pocket.

The moving units of the robot cleaner may use a pair of spinning mops contacting the floor and rotated to wipe the floor, the robot cleaner may further include a foreign substance pocket configured to remove foreign substances attached to outer circumferences of the spinning mops, and thus primary cleaning through the spinning mops may be performed and the foreign substances attached to the spinning mops may be removed.

The cleaning module may be arranged so as to be detachably attached to the side of the main body, the robot cleaner may further include a coupler configured to fix the cleaning module installed in the main body, and thus the cleaning module rotatably connected to the main body may be stably attached to or detached from the main body.

The cleaning module may include a rotational member to which a dustcloth is fixed, a rotary protrusion fixedly connected to one side of the rotational member and provided so as to be insertable into a rotary protrusion recess of the module driving unit, and a stationary protrusion rotatably connected to the other side of the rotational member and provided so as to be insertable into a stationary protrusion insertion recess formed at one side of the module housing or on the coupler, and thus the cleaning module may be easily installed in the main body and be stably rotated after installation.

An outer circumference of the stationary protrusion may have a polygonal shape, the stationary protrusion insertion recess may form a hole having a polygonal structure corresponding to the shape of the stationary protrusion by coupling to the coupler, and thus the cleaning module may be stably installed in the main body.

An outer circumferential surface of the rotary protrusion may form a polygonal shape having m corners, an outer circumferential surface of the stationary protrusion may form a polygonal shape having n corners, m may be a natural number being less than n, and thus the stationary protrusion may be easily installed at one side of the main body.

To achieve the above objects, there is provided a robot cleaner including a main body forming an external appearance of the robot cleaner, moving units configured to move the main body, a cleaning module arranged so as to be detachably attached to one side of the main body and provided so as to contact a floor, a module driving unit arranged in the main body and rotating one end of the cleaning module, and a coupler arranged in the main body and fixing the other end of the cleaning module, so as to easily detachably attach the cleaning module rotatable by the module driving unit to the main body.

Advantageous Effects

First, the robot cleaner in accordance with the present invention includes a dust pocket which removes dust bunnies attached to a dustcloth during an operation process, and may thus use one cleaning module for a long time and increase a replacement cycle of the cleaning module.

Second, the robot cleaner in accordance with the present invention has a structure, in which the cleaning module rotated by a module driving unit is detachably attached to a main body, and may thus provide user convenience in attachment and detachment of the cleaning module.

Third, the cleaning module of the robot cleaner in accordance with the present invention includes a rotational member, a rotary protrusion and a fixing protrusion and is operated by the module driving unit and, thus, various cleaning modules, i.e., the rotational member, into which a dustcloth forming a rolling mop is inserted, and a dustcloth tilting member tilted relative to a floor surface to wipe the floor, may be used.

DETAILED DESCRIPTION OF THE EMBODIMENTS

The advantages and features of the present invention and the way of attaining the same will become apparent with reference to embodiments described below in conjunction with the accompanying drawings. Reference will now be made in detail to the preferred embodiments of the present invention, examples of which are illustrated in the accompanying drawings. Wherever possible, the same reference numbers will be used throughout the drawings to refer to the same or like parts.

Hereinafter, robot cleaners 10 in accordance with embodiments of the present invention will be described with reference to the accompanying drawings.

Figure 1:
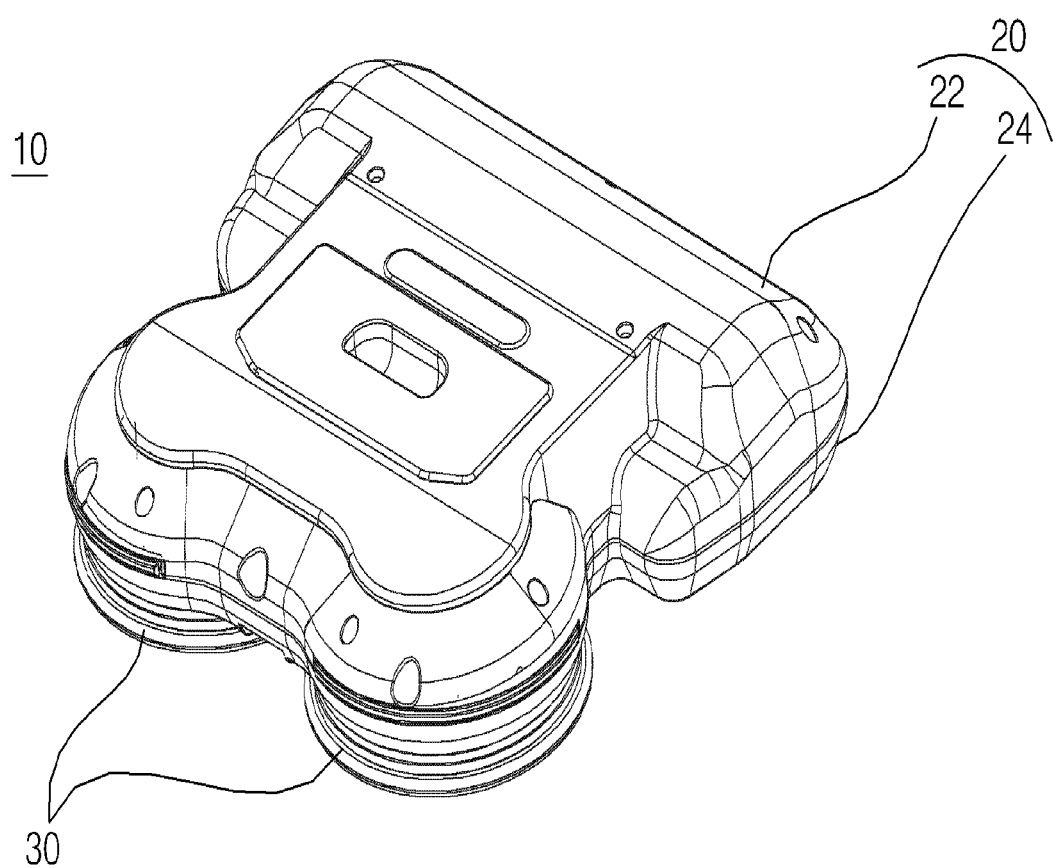
FIG. 1 is a perspective view of a robot cleaner in accordance with one embodiment of the present invention.
Figure 2:
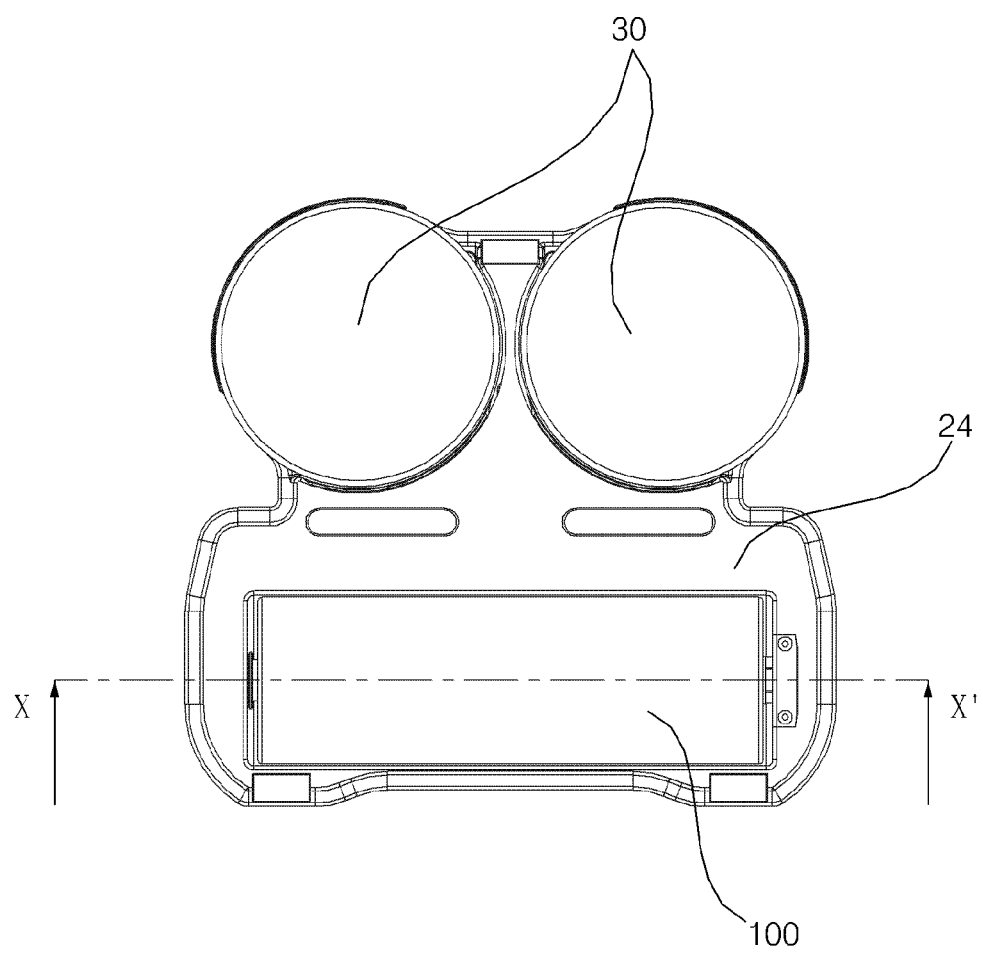
FIG. 2 is a bottom view of the robot cleaner in accordance with the embodiment of the present invention.
Figure 3:
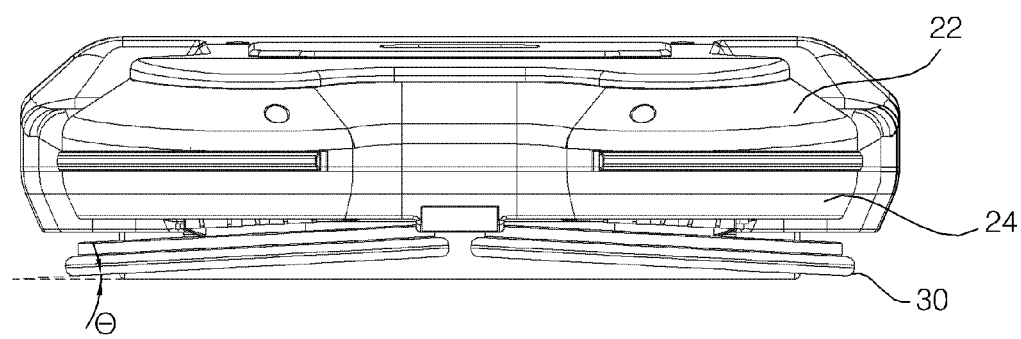
FIG. 3 is a front view of the robot cleaner in accordance with the embodiment of the present invention.
Figure 4:
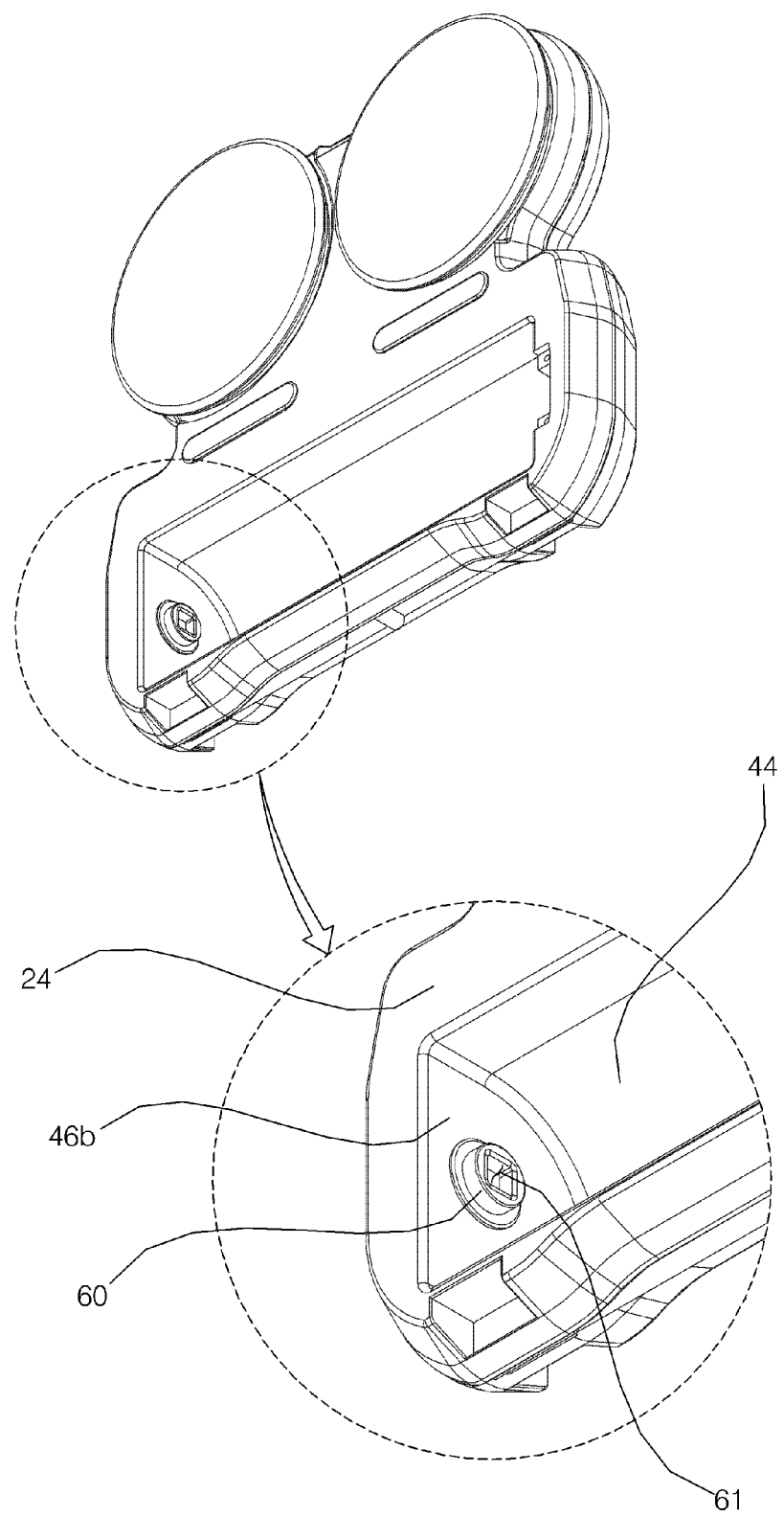
FIG. 4 is a perspective view illustrating one side of a module housing in accordance with the embodiment of the present invention.
Figure 5:
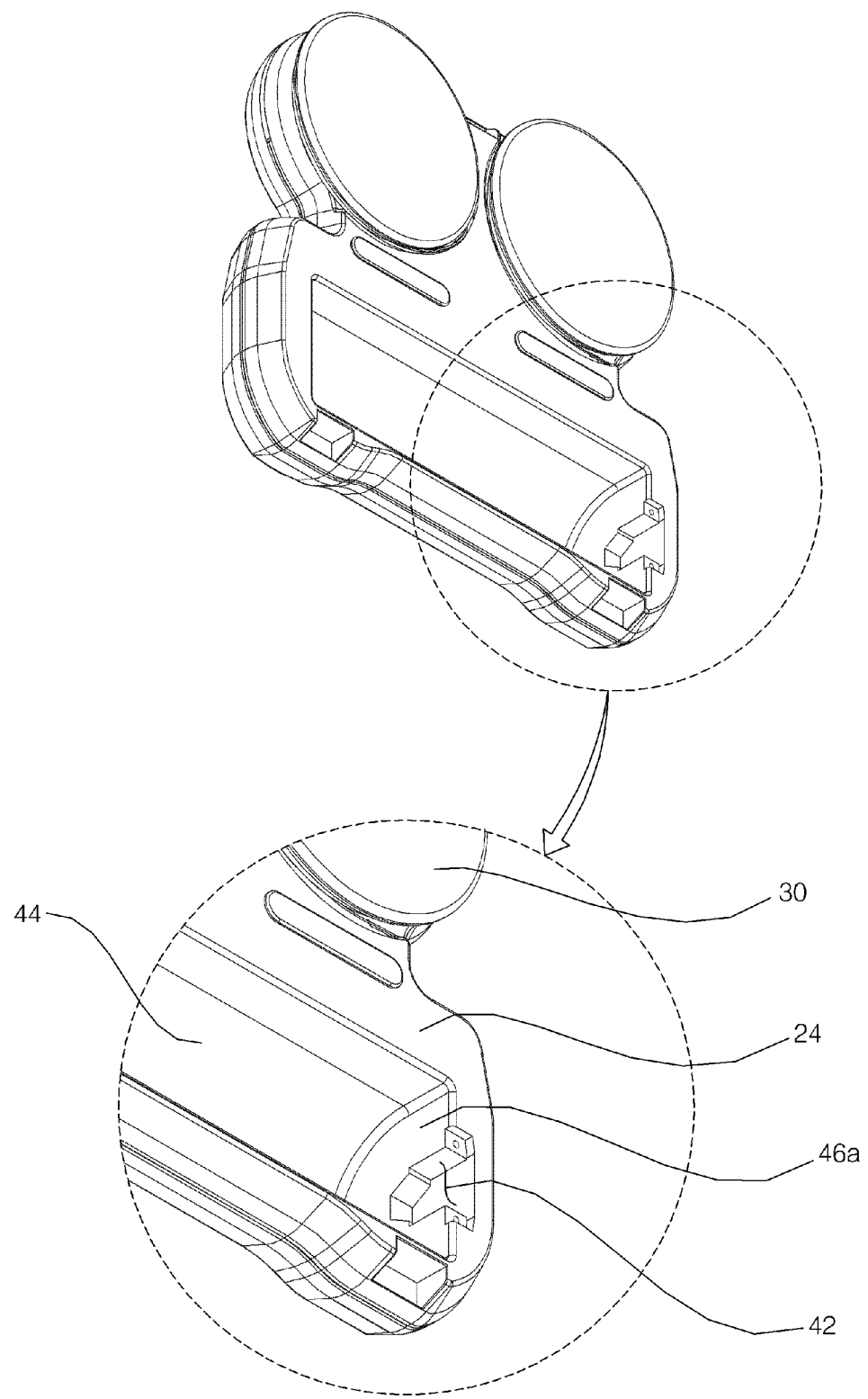
FIG. 5 is a perspective view illustrating the other side of the module housing in accordance with the embodiment of the present invention.
Figure 6:
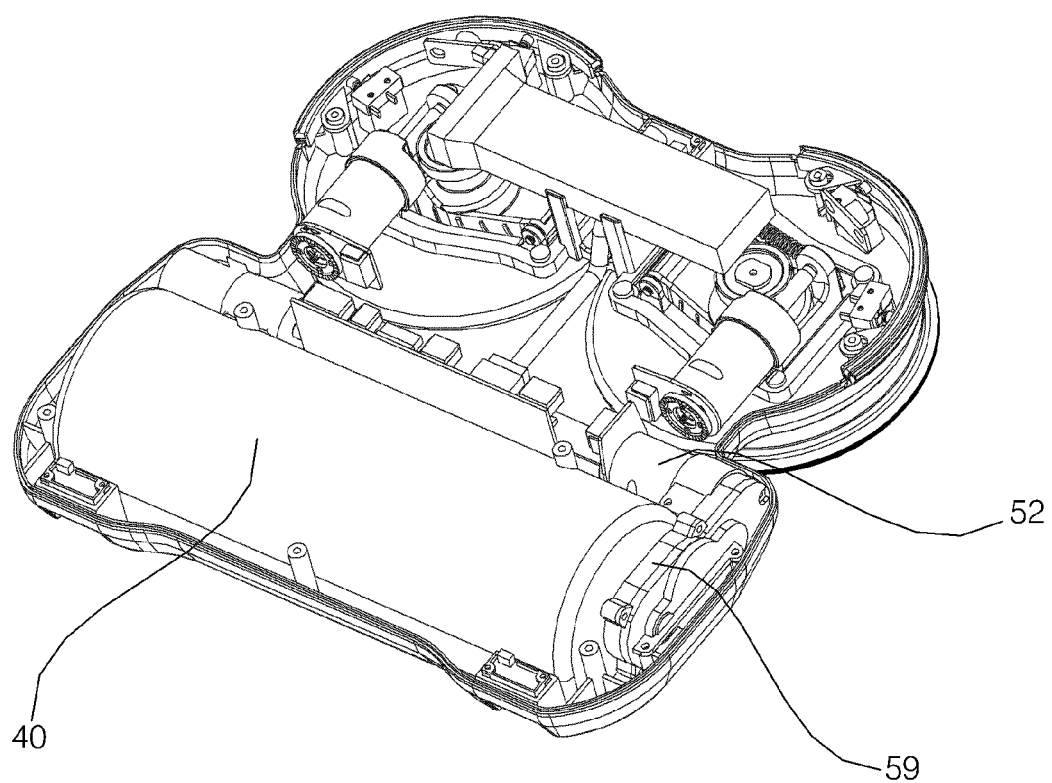
FIG. 6 is a perspective view of one side of the robot cleaner in accordance with the embodiment of the present invention, from which an upper cover is removed.
Figure 7:
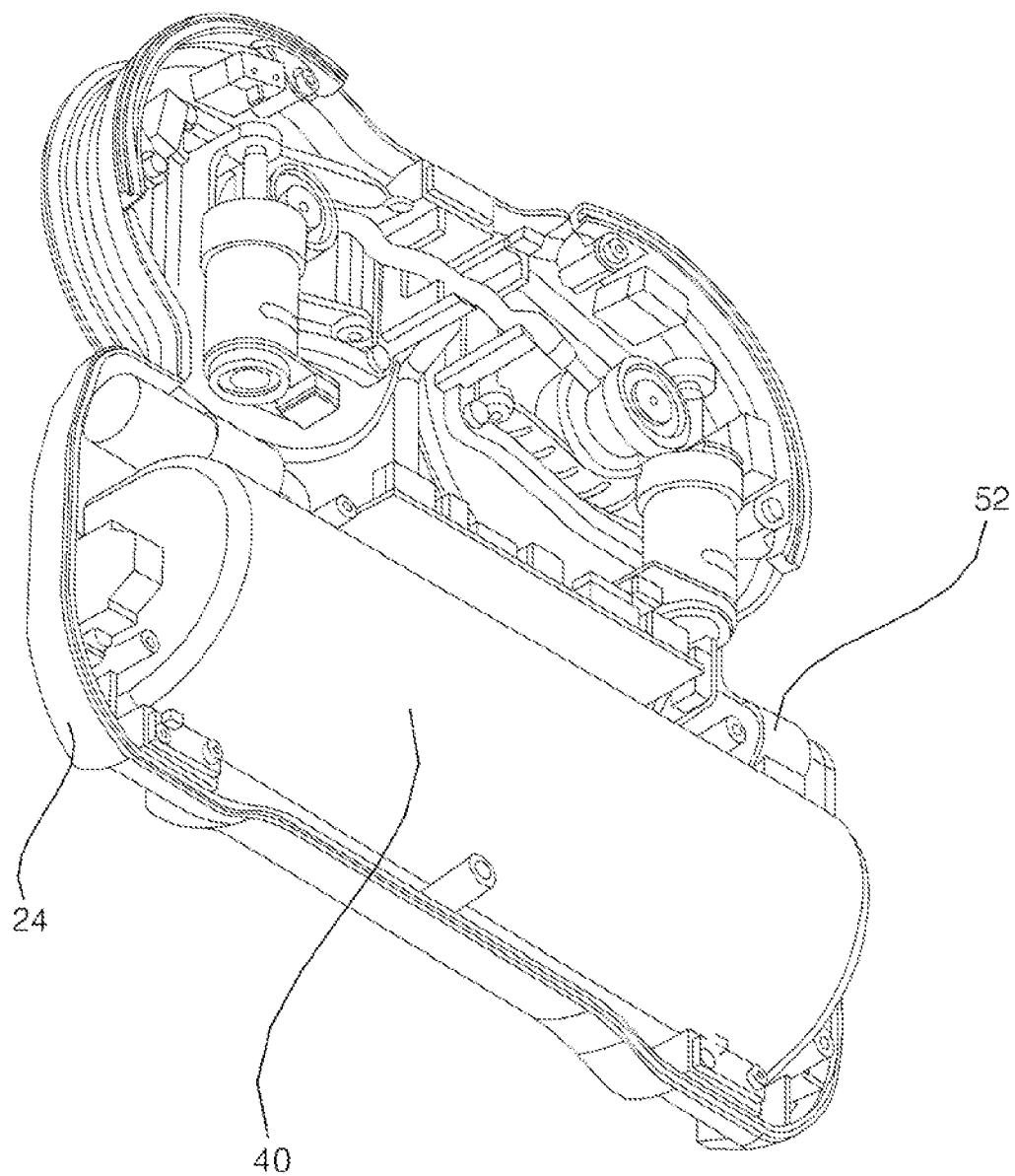
FIG. 7 is a perspective view of the other side of the robot cleaner in accordance with the embodiment of the present invention, from which the upper cover is removed.

FIG. 1 is a perspective view of a robot cleaner in accordance with one embodiment of the present invention. FIG. 2 is a bottom view of the robot cleaner in accordance with the embodiment of the present invention. FIG. 3 is a front view of the robot cleaner in accordance with the embodiment of the present invention. FIG. 4 is a perspective view illustrating one side of a module housing in accordance with the embodiment of the present invention. FIG. 5 is a perspective view illustrating the other side of the module housing in accordance with the embodiment of the present invention. FIG. 6 is a perspective view of one side of the robot cleaner in accordance with the embodiment of the present invention, from which an upper cover is removed. FIG. 7 is a perspective view of the other side of the robot cleaner in accordance with the embodiment of the present invention, from which the upper cover is removed.

Hereinafter, an overall configuration of a robot cleaner in accordance with this embodiment and a module housing of a main body of the robot cleaner, in which a cleaning module is received, will be described with reference to FIGS. 1 to 7.

A robot cleaner 10 in accordance with this embodiment includes a main body 20 forming the external appearance of the robot cleaner 10, moving units 30 to move the main body 20, a cleaning module 100 arranged at one side of the main body 20 so as to contact a floor and rotated, a module driving unit 50 arranged in the main body 20 and rotating the cleaning module 100, and a dust pocket 80 to remove foreign substances attached to the outer circumference of the cleaning module 100.

The robot cleaner 10 in accordance with this embodiment includes the main body 20 forming the external appearance of the robot cleaner 10, the moving units 30 to move the main body 20, the cleaning module 100 arranged so as to be detachably attached to one side of the main body 20 and contacting the floor, the module driving unit 50 arranged in the main body 20 and rotating one end of the cleaning module 100, and a coupler 70 arranged in the main body 20 and fixing the other end of the cleaning module 100. The main body 20 forms a module housing 40 having an inner space so as to receive a part of the cleaning module 100.

The robot cleaner 100 in accordance with this embodiment may further include driving motors provided in the main body 20 so as to drive the moving units 30, and a controller to control the moving units 30. Further, the robot cleaner 10 may further include a storage unit to store water and flow paths and a pump to supply water, provided in the main body 20 according to functions of the robot cleaner 10. The main body 20 may include an upper cover 22 covering an upper portion of the robot cleaner 10 to protect elements provided in the robot cleaner 10, and a base 24 connected to the moving units 30, such as spinning mops, or a bumper.

The moving units 30 of the robot cleaner 10 are units to move the main body 20 and may include wheels, rolling mops or spinning mops and, in this embodiment, spinning mops, which contact the floor and are rotated to wipe the floor, will be described as the moving units 30. However, the spinning mop is only one embodiment, and the present invention is not limited thereto and may thus be applied to a robot cleaner 10 using wheels, etc., as the moving units 30.

With reference to FIG. 3, in the robot cleaner 10 in accordance with this embodiment, the spinning mop is arranged so as to be tilted at a designated angle θ from a floor surface. In order to effectively move the robot cleaner 10, the overall surface of the spinning mop does not uniformly contact the floor surface, and is tilted at the designated angle θ so that a designated part of the spinning mop contacts the floor surface.

The main body 20 is connected to the moving units 30. The main body 20 is moved by the moving units 30. The moving unit 30 in accordance with this embodiment includes a driving unit, such as a motor, driven by power, and the spinning mop moved by the driving unit.

The main body 20 of the robot cleaner 10 in accordance with this embodiment forms the module housing 40 which receives the cleaning module 100 contacting the floor. With reference to FIGS. 4, 6 and 7, the module housing 40 in accordance with this embodiment forms the space to receive a part of the cleaning module 100 and a lower portion of the module housing 40 is open. A rotary protrusion connection member 60 which rotates the cleaning module 100 is arranged at one side of the module housing 40. A stationary protrusion insertion recess 42 which fixes arrangement of the cleaning module 100 is formed at the other side of the module housing 40.

With reference to FIGS. 5 to 7, the module housing 40 is formed by inwardly depressing a part of the base 24 of the main body 20. The module housing 40 forms a space in which the cleaning module 100 is rotated. The module housing 40 includes a circumferential surface part 44 corresponding to the circumferential surface of the cleaning module 100 having an approximately cylindrical shape and a pair of side surface parts 46 formed on a rotary shaft of the cleaning module 100.

The stationary protrusion insertion recess 42 which fixes a stationary protrusion 120 rotatably arranged at one side of a rotational member 110, which will be described later, is formed at one side of the module housing 40 or on the coupler 70, which will be described later, in accordance with this embodiment. The stationary protrusion insertion recess 42 may be formed at one side of the module housing 40 or formed on the coupler 70. However, this embodiment exemplarily describes the stationary protrusion insertion recess 42 which is formed at one side of the module housing 40 so as to receive and fix both the stationary protrusion 120 and the coupler 70.

With reference to FIG. 5, the stationary protrusion insertion recess 42, into which the stationary protrusion 120 of the cleaning module 100 is inserted, is formed on one side surface 46a out of a pair of the side surfaces 46 forming the module housing 40. The stationary protrusion insertion recess 42 forms a space in which the stationary protrusion 120 formed at one side of the cleaning module 100 is arranged. A lower portion of the stationary protrusion insertion recess 42 is open so that the stationary protrusion 120 of the cleaning module 100 can be inserted into or withdrawn from the stationary protrusion insertion recess 42. The stationary protrusion insertion recess 42 has a shape corresponding to the outer circumference of the stationary protrusion 120. The stationary protrusion insertion recess 42 in accordance with this embodiment has a shape corresponding to an upper portion of the stationary protrusion 120 having a polyprism shape. The stationary protrusion insertion recess 42 forms a space in which the coupler 70, which will be described later, is received. The stationary protrusion insertion recess 42 forms an additional clearance 43 (with reference to FIG. 16B) in the space in which the stationary protrusion 120 is installed. The cleaning module 100 may be freely attached to and detached from the module housing 40 due to the clearance 43. The stationary protrusion insertion recess 42 fixes the coupler 70 and the stationary protrusion 120 of the cleaning module 100. The stationary protrusion insertion recess 42 forms a hole having a polygonal structure corresponding to the shape of the stationary protrusion 120 by coupling to the coupler 70.

With reference to FIG. 4, the rotary protrusion connection member 60 connected to a rotary protrusion 130 of the cleaning module 100 is arranged on the other side surface 46b out of a pair of the side surfaces 46 forming the module housing 40. The rotary protrusion connection member 60 is connected to a module driving motor 52, which will be described later, thus rotating the cleaning module 100. The rotary protrusion connection member 60 has a shape corresponding to the outer circumference of the rotary protrusion 130. A recess 61 having a shape, which may receive the rotary protrusion 130, is formed on the rotary protrusion connection member 60. The rotary protrusion connection member 60 is coupled to the rotary protrusion 130 by inserting the rotary protrusion 130 into the recess 161. The recess 161 formed on the rotary protrusion connection member 60 has a shape corresponding to a polygonal structure of the rotary protrusion 130.

Figure 8:
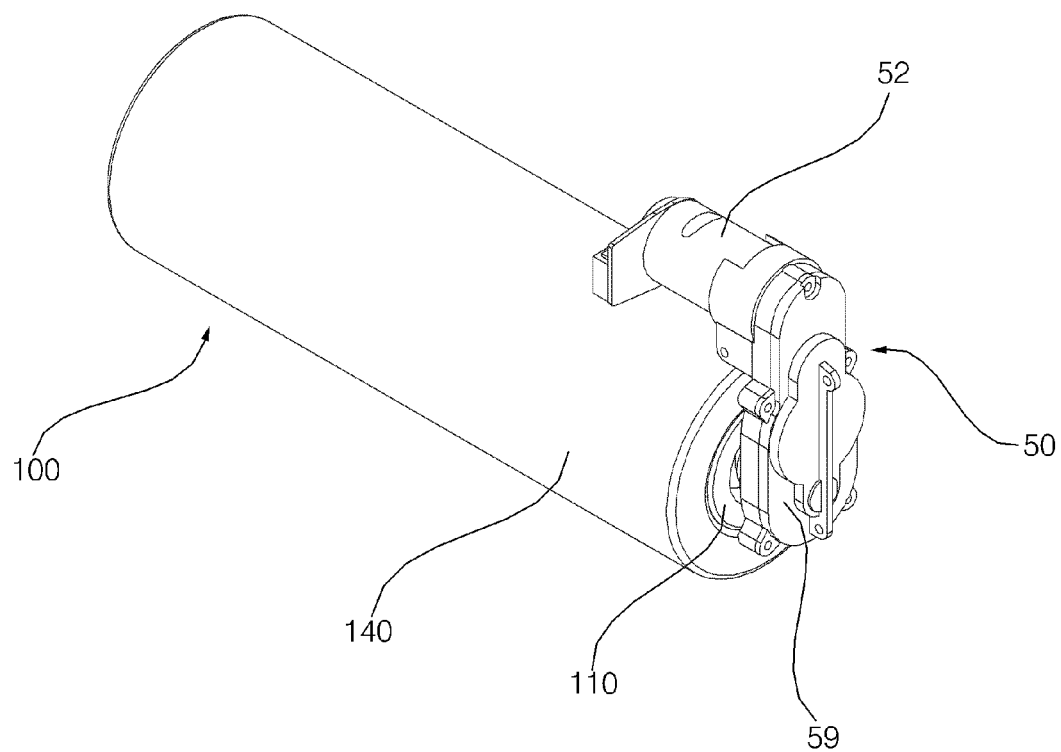
FIG. 8 is a view illustrating a coupling state between a cleaning module and a module driving unit in accordance with the embodiment of the present invention.
Figure 9:
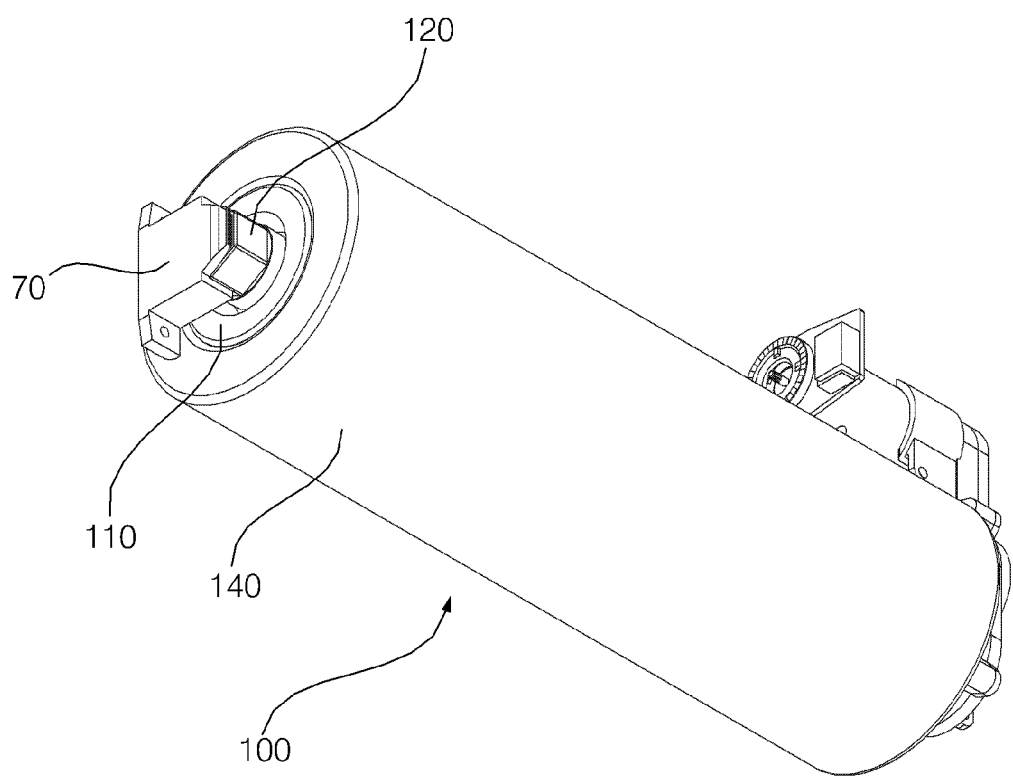
FIG. 9 is a view illustrating a coupling state between the cleaning module and a coupler in accordance with the embodiment of the present invention.
Figure 10:
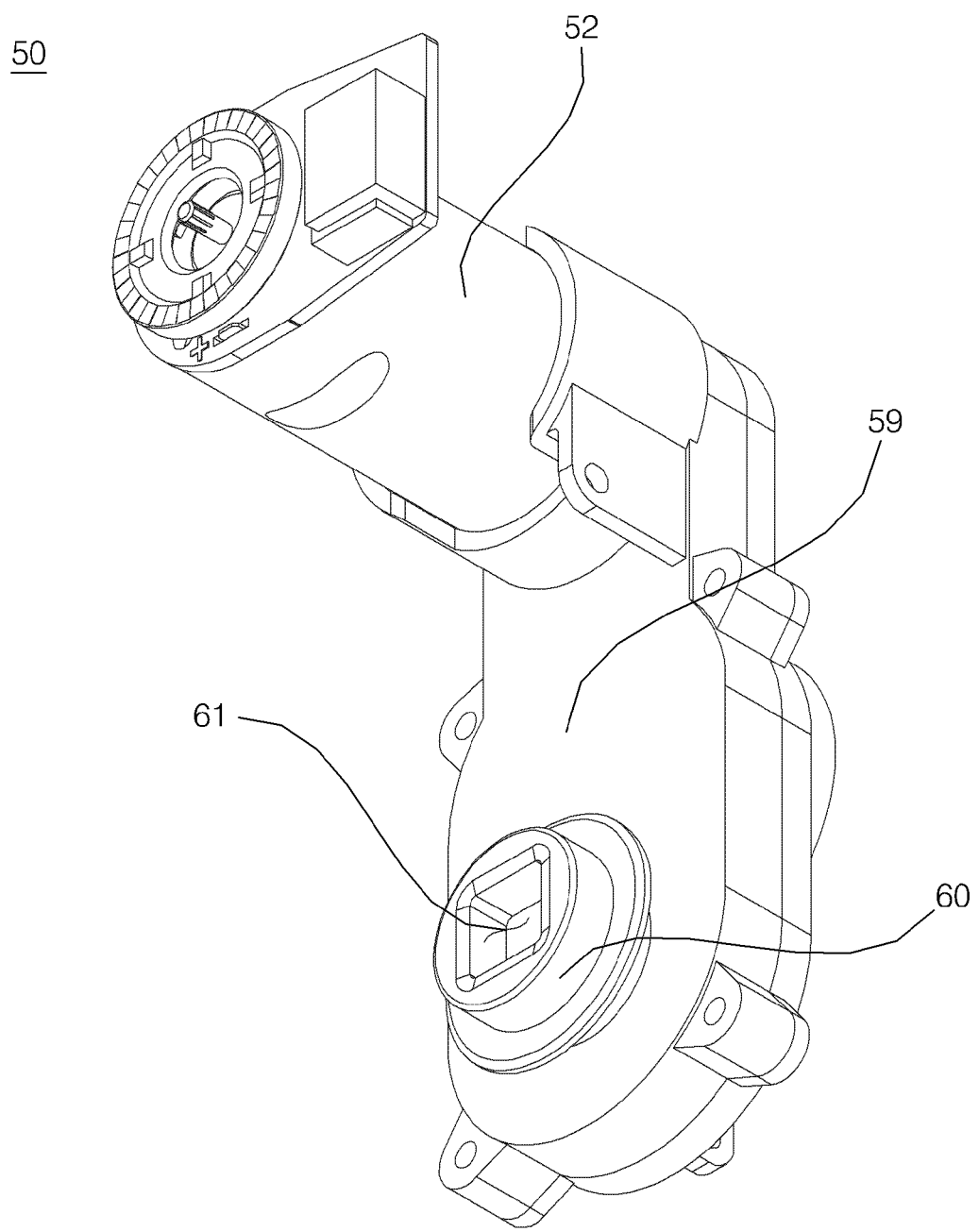
FIG. 10 is a perspective view of the module driving unit in accordance with the embodiment of the present invention.
Figure 11:
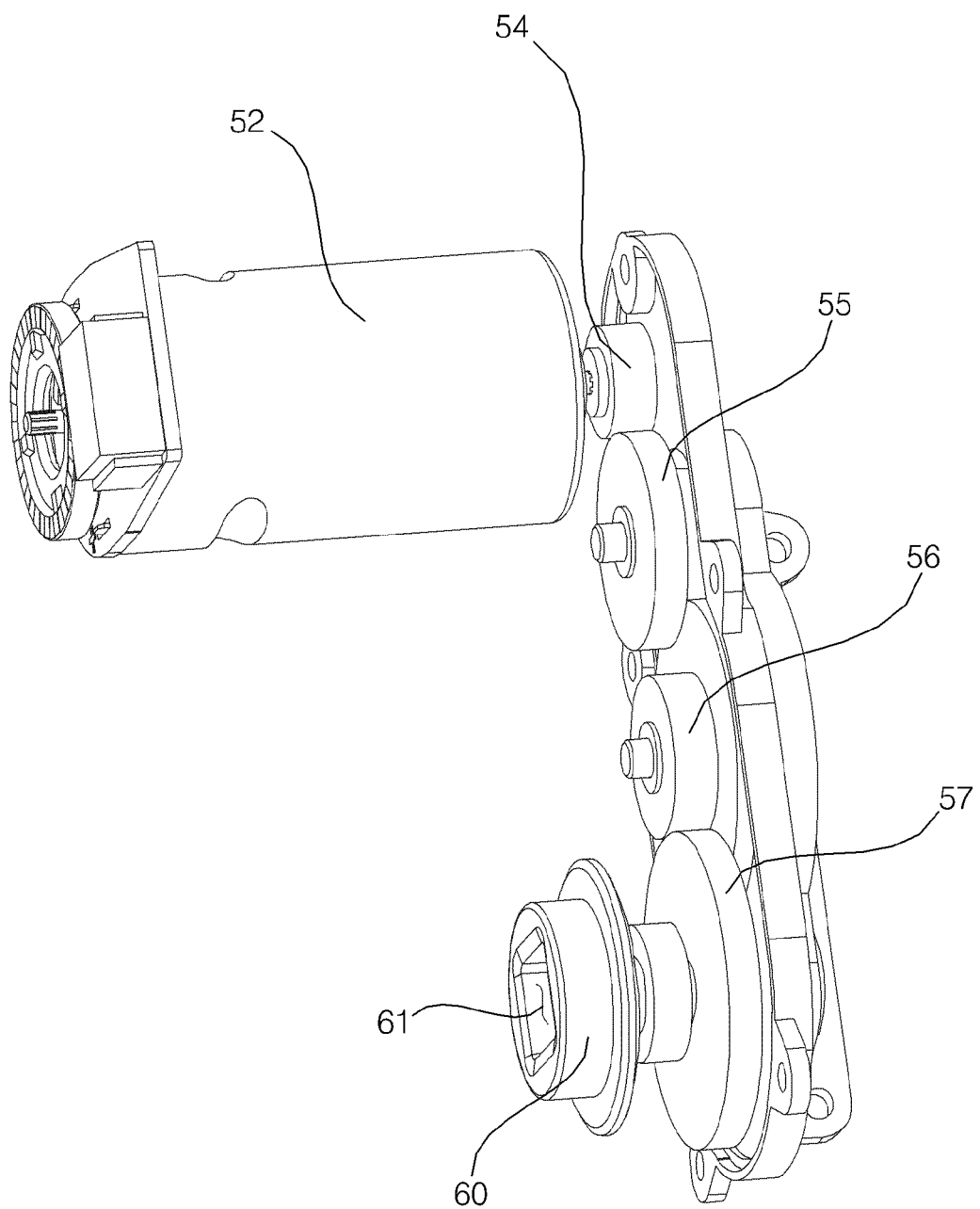
FIG. 11 is a perspective view of the module driving unit in accordance with the embodiment of the present invention, from which a gear cabinet is removed.
Figure 12:
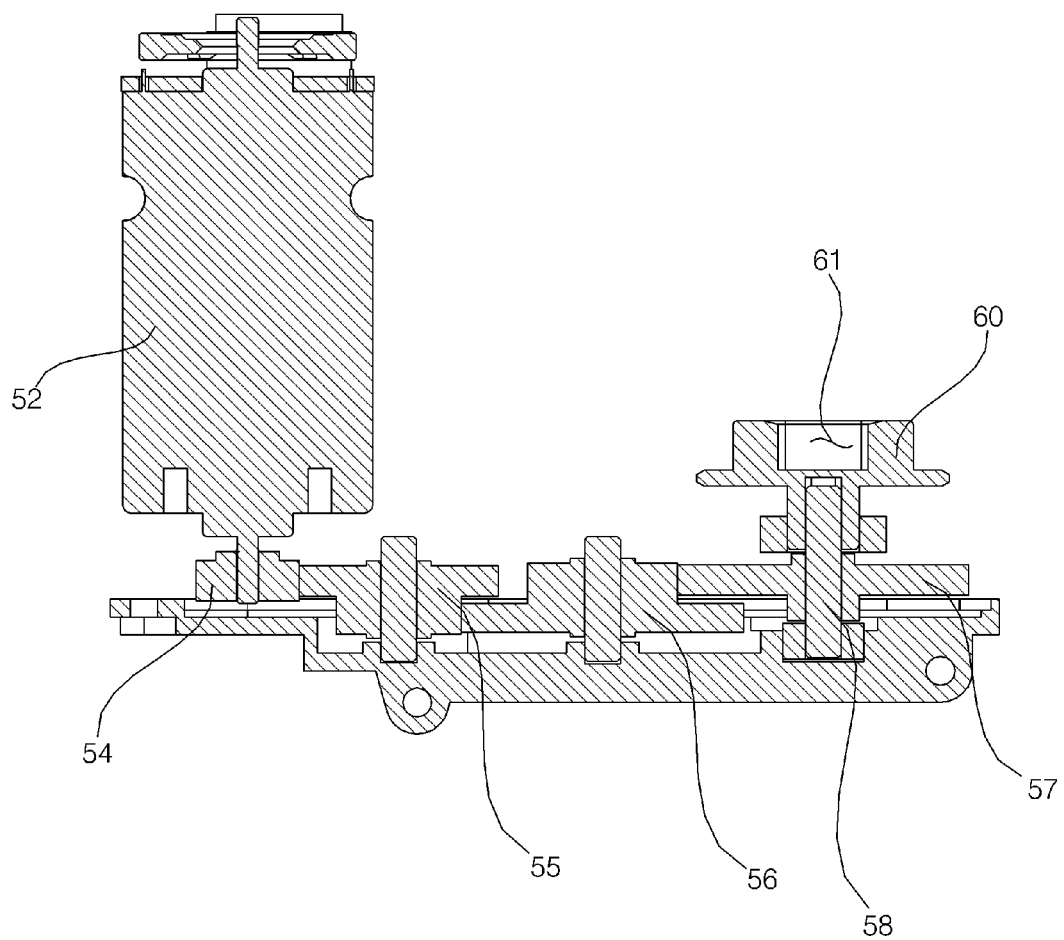
FIG. 12 is a cross-sectional view illustrating connection relations between gears of the module driving unit of FIG. 11.
Figure 13:
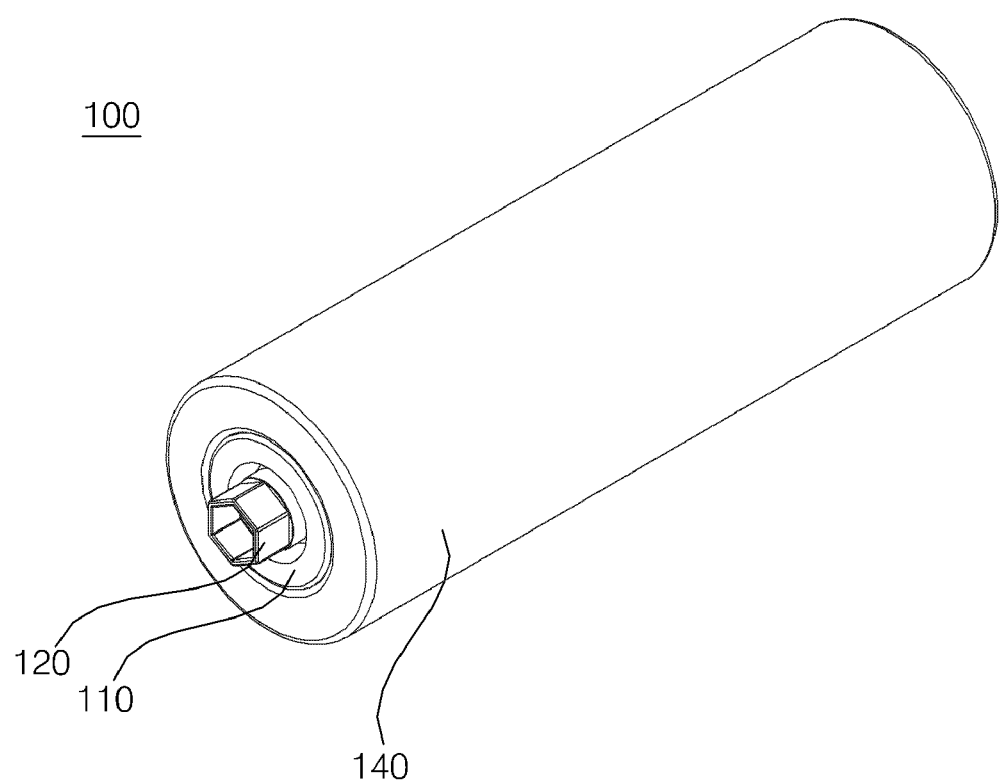
FIG. 13 is a perspective view of one side of the cleaning module in accordance with the embodiment of the present invention.
Figure 14:
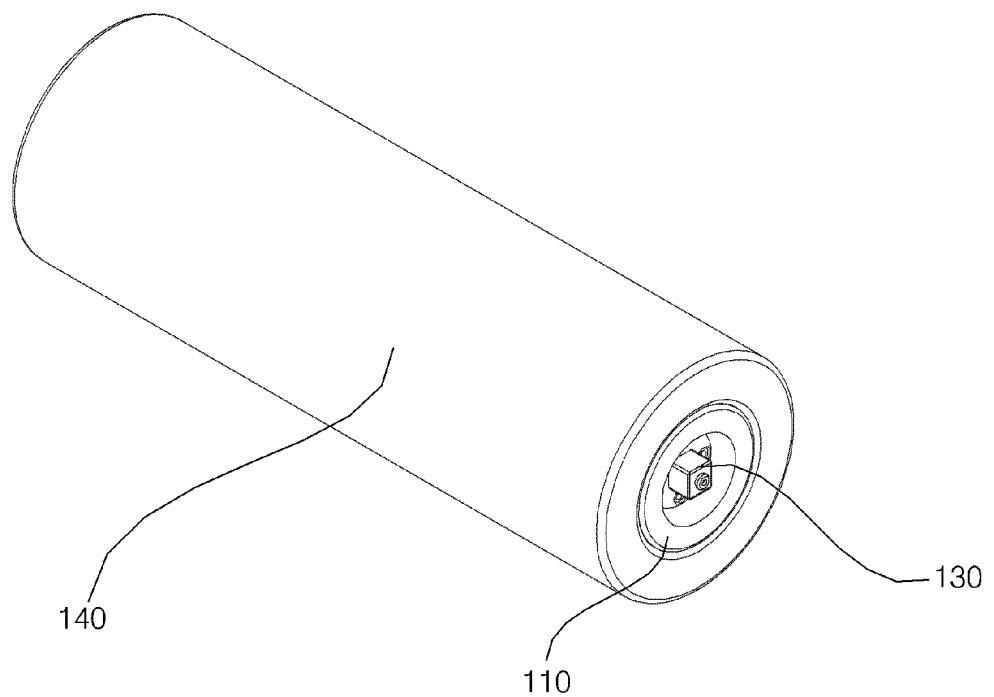
FIG. 14 is a perspective view of the other side of the cleaning module in accordance with the embodiment of the present invention.
Figure 15:
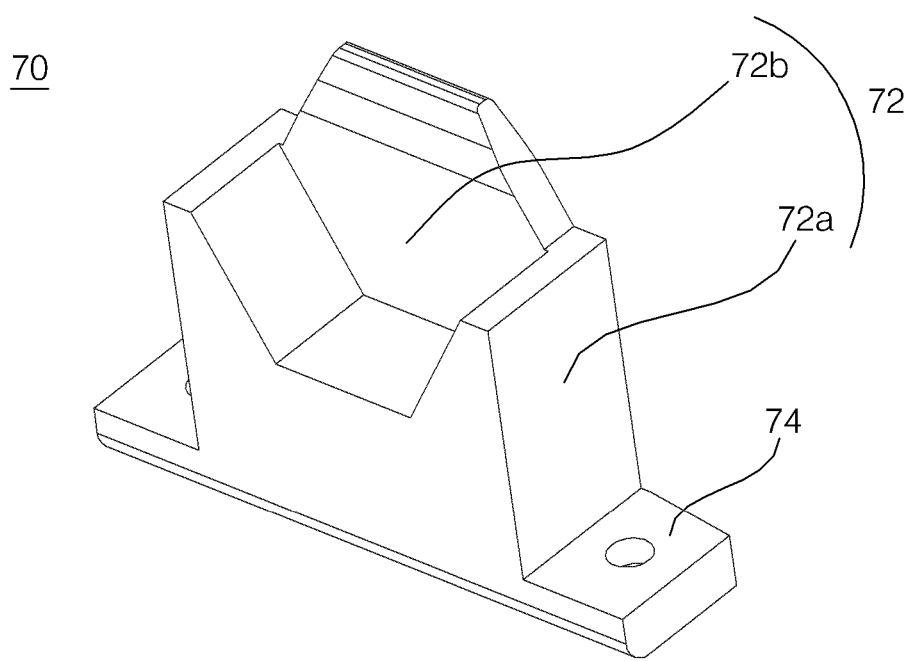
FIG. 15 is a perspective view of the coupler in accordance with the embodiment of the present invention.
Figure 16A:
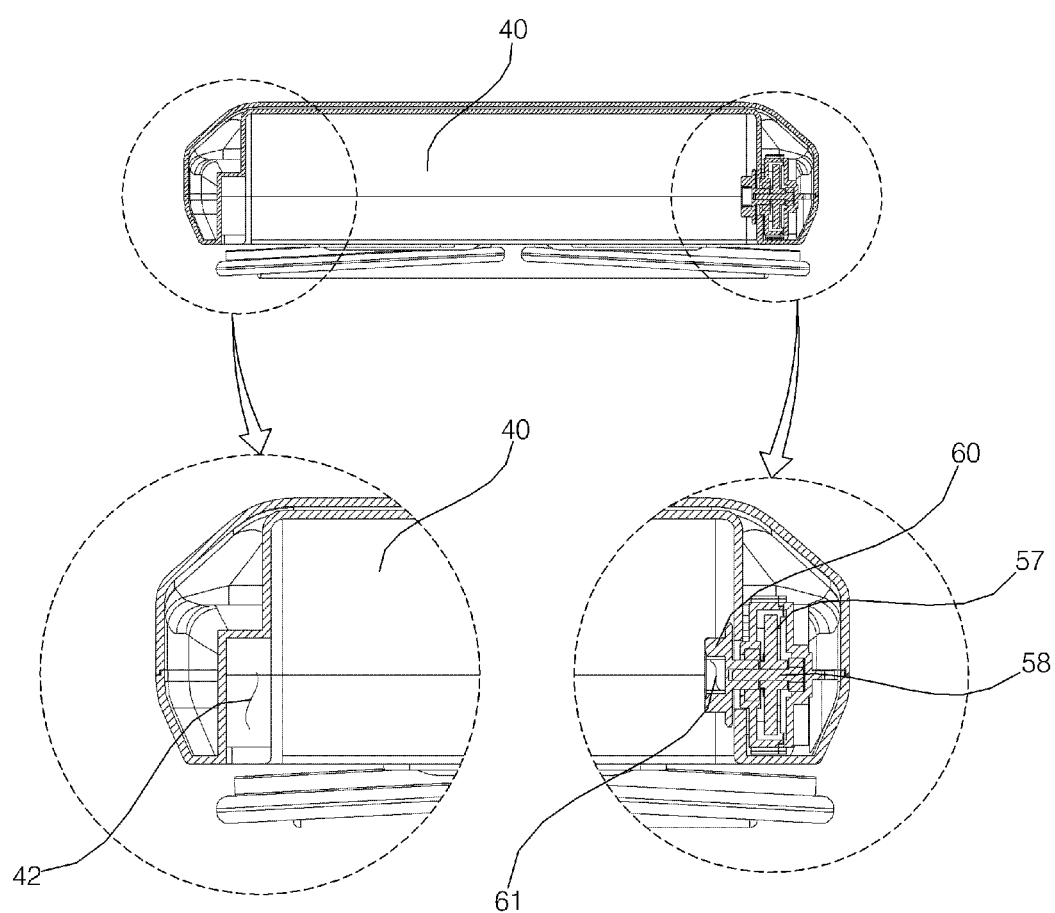
FIG. 16A illustrates a cross-sectional view of the robot cleaner of FIG. 2, from which the cleaning module and the coupler are removed, taken along line X-X', and partially enlarged views of the robot cleaner.
Figure 16B:
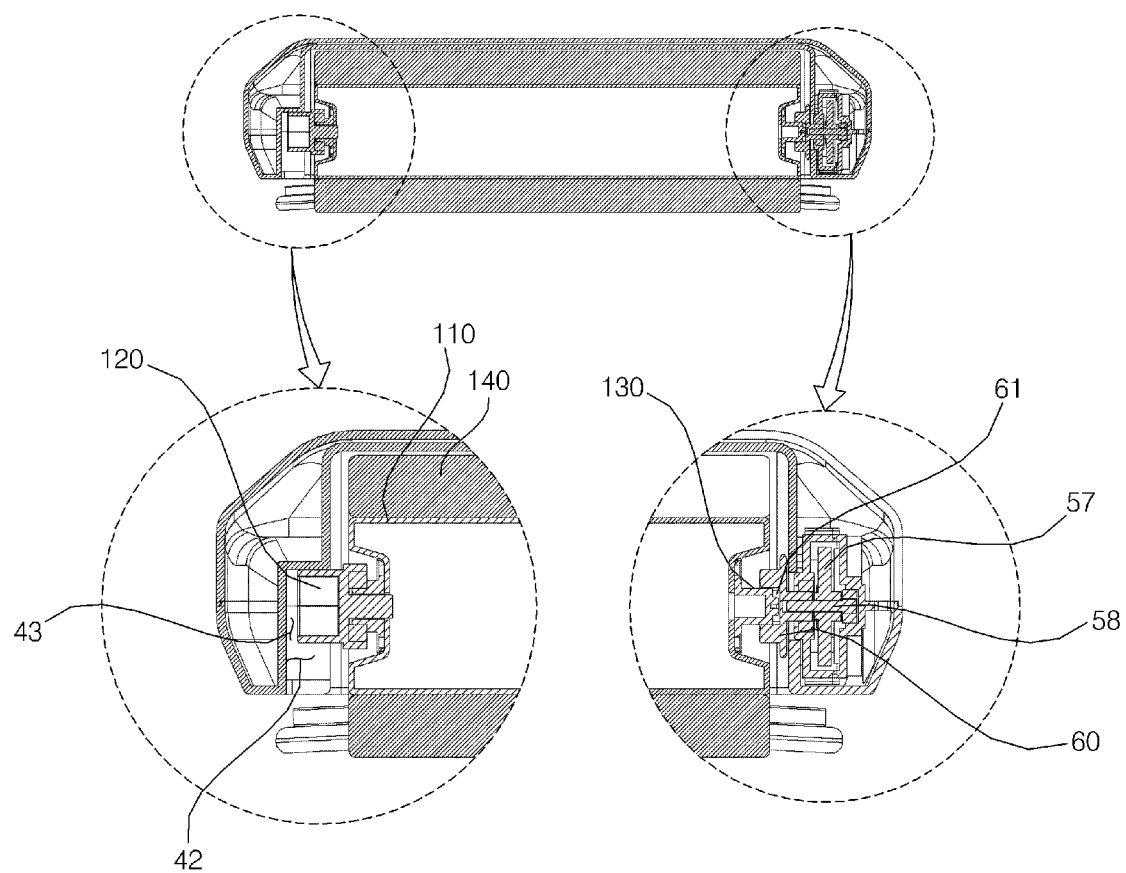
FIG. 16B illustrates a cross-sectional view of the robot cleaner of FIG. 2, from which the coupler is removed, taken along line X-X', and partially enlarged views of the robot cleaner.
Figure 16C:
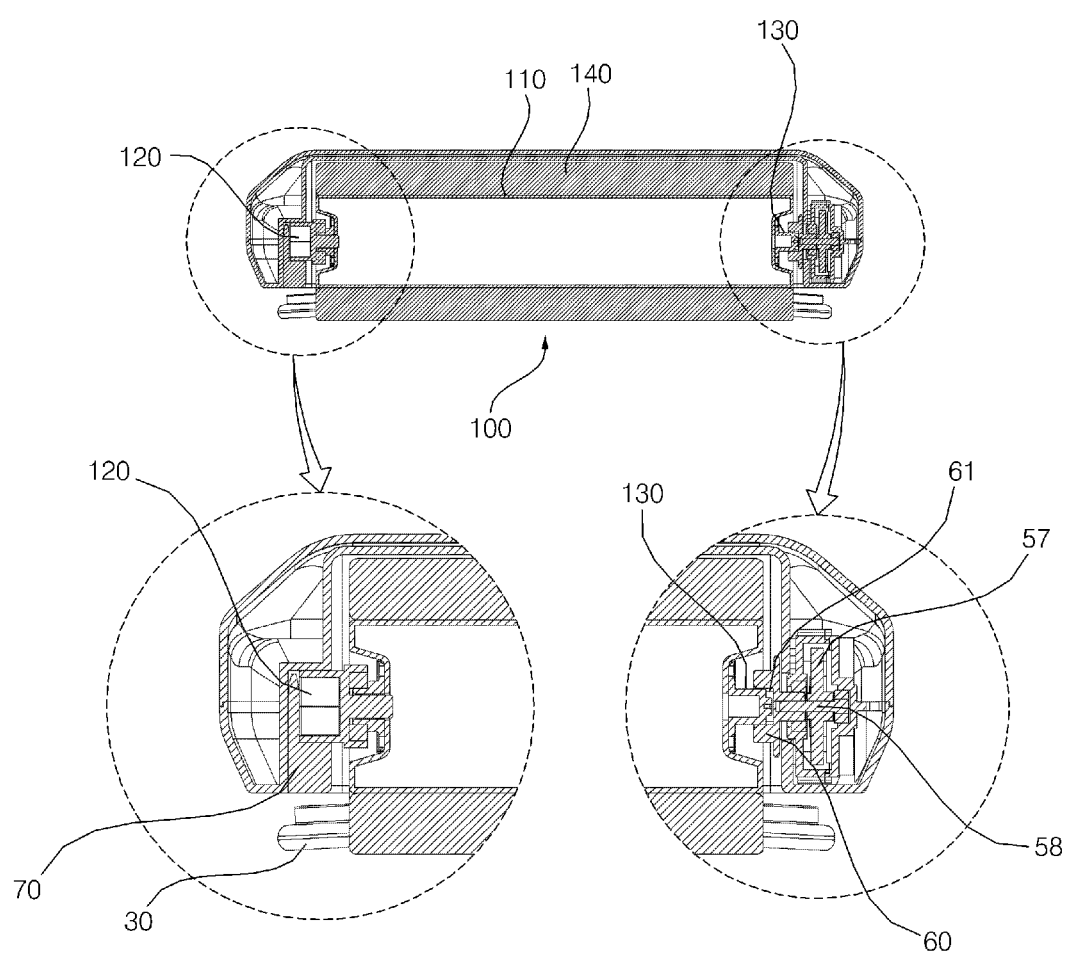
FIG. 16C illustrates a cross-sectional view of the robot cleaner of FIG. 2, taken along line X-X', and partially enlarged views of the robot cleaner.
Figure 17A:
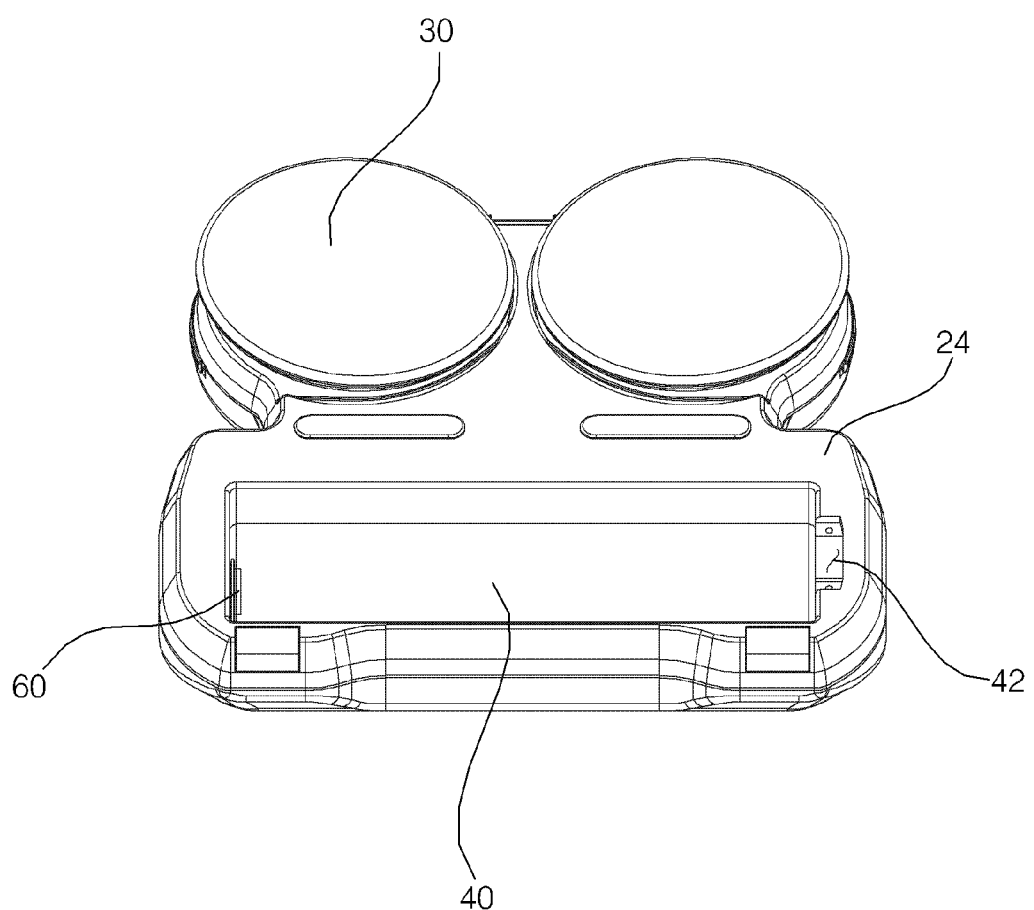
FIG. 17A is a perspective view of the robot cleaner in accordance with the embodiment of the present invention, from which the cleaning module and the coupler are removed.
Figure 17B:
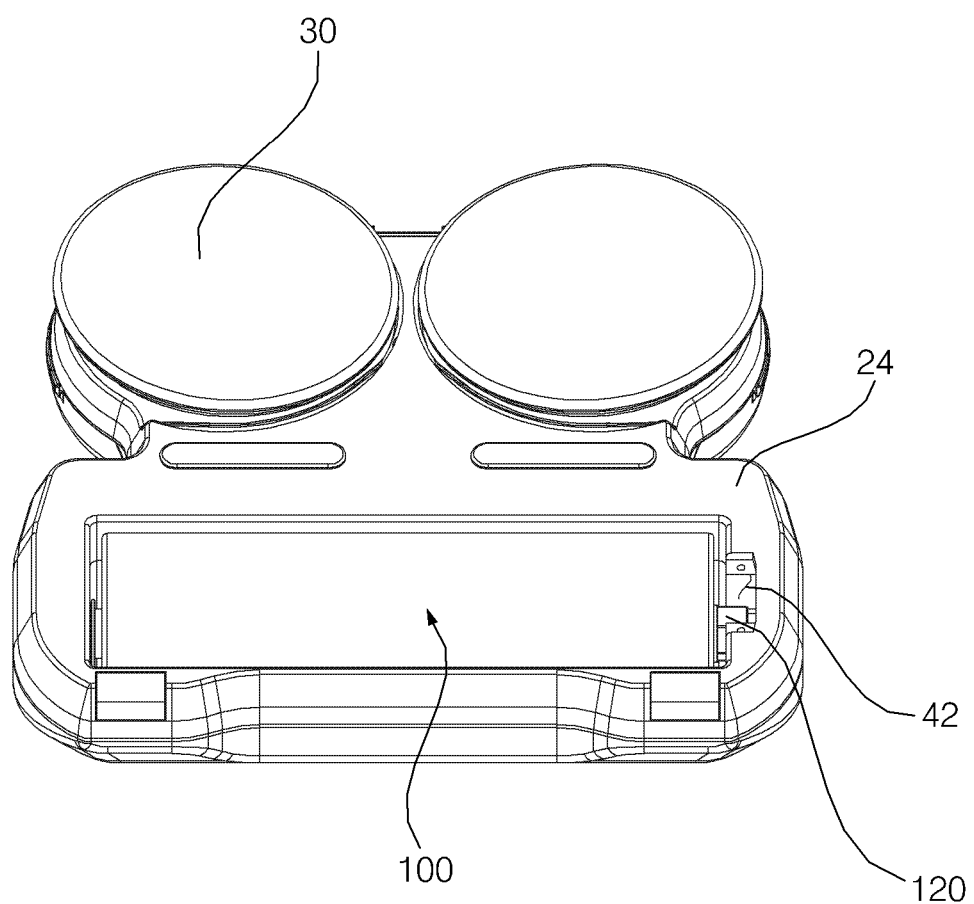
FIG. 17B is a perspective view of the robot cleaner of FIG. 17A, in which the cleaning module is installed.
Figure 17C:
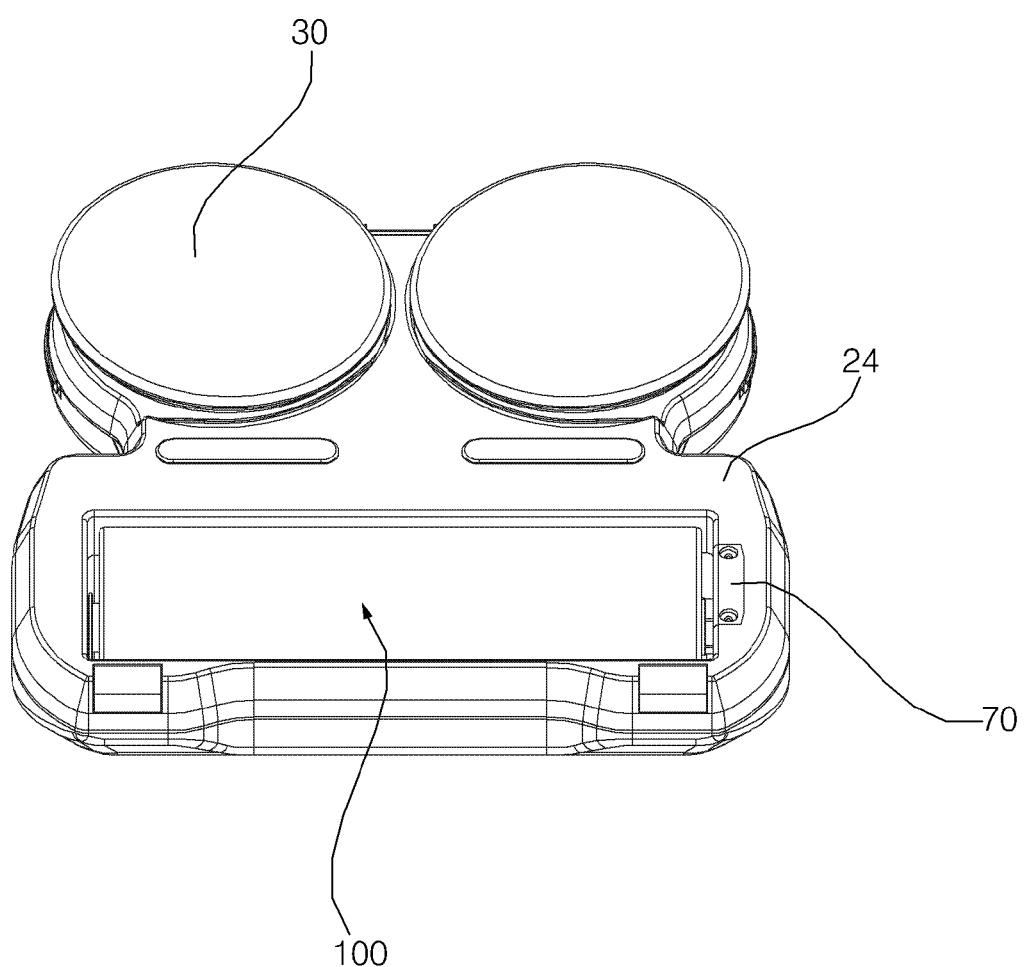
FIG. 17C is a perspective view of the robot cleaner of FIG. 17B, in which the coupler is installed.

FIG. 8 is a view illustrating a coupling state between the cleaning module and the module driving unit in accordance with the embodiment of the present invention. FIG. 9 is a view illustrating a coupling state between the cleaning module and the coupler in accordance with the embodiment of the present invention. FIG. 10 is a perspective view of the module driving unit in accordance with the embodiment of the present invention. FIG. 11 is a perspective view of the module driving unit in accordance with the embodiment of the present invention, from which a gear cabinet is removed. FIG. 12 is a cross-sectional view illustrating connection relations between gears of the module driving unit of FIG. 11. FIG. 13 is a perspective view of one side of the cleaning module in accordance with the embodiment of the present invention. FIG. 14 is a perspective view of the other side of the cleaning module in accordance with the embodiment of the present invention. FIG. 15 is a perspective view of the coupler in accordance with the embodiment of the present invention. FIG. 16A illustrates a cross-sectional view of the robot cleaner of FIG. 2, from which the cleaning module and the coupler are removed, taken along line X-X', and partially enlarged views of the robot cleaner, FIG. 16B illustrates a cross-sectional view of the robot cleaner of FIG. 2, from which the coupler is removed, taken along line X-X', and partially enlarged views of the robot cleaner, and FIG. 16C illustrates a cross-sectional view of the robot cleaner of FIG. 2, taken along line X-X', and partially enlarged views of the robot cleaner. FIG. 17A is a perspective view of the robot cleaner in accordance with the embodiment of the present invention, from which the cleaning module and the coupler are removed, FIG. 17B is a perspective view of the robot cleaner of FIG. 17A, in which the cleaning module is installed, and FIG. 17C is a perspective view of the robot cleaner of FIG. 17B, in which the coupler is installed.

Hereinafter, configurations of the module driving unit, the cleaning module and the coupler and connection relations thereof with the main body will be described with reference to FIGS. 8 to 17C.

The robot cleaner in accordance with this embodiment includes the main body 20 forming the external appearance of the robot cleaner, the moving units 30 to move the main body 20, the cleaning module 100 arranged so as to be detachably attached to one side of the main body 20 and contacting the floor, the module driving unit 50 arranged in the main body 20 and rotating one end of the cleaning module 100, and the coupler 70 arranged in the main body 20 and fixing the other end of the cleaning module 100, the cleaning module 100 includes the rotational member 110, to which a dustcloth is fixed, the end of the cleaning module 100 is fixedly connected to the rotational member 110, and the other end of the cleaning module 100 is rotatably connected to the rotational member 110.

In the robot cleaner in accordance with this embodiment, a first recess may be formed on one of the end of the cleaning module 100 and the module driving unit 50 and a first protrusion engaged with the first recess may be formed on the other, and a second recess may be formed on one of the other end of the cleaning module 100 and the coupler 70 and a second protrusion engaged with the second recess may be formed on the other. Therefore, in the robot cleaner in accordance with this embodiment, the cleaning module 100 may be stably rotated under the condition that the cleaning module 100 is installed on the main body 20.

With reference to FIGS. 4 and 5 and FIGS. 13 to 15, the rotary protrusion 130 and the stationary protrusion 120 serving as the first protrusion and the second protrusion are formed at both sides of the rotational member 110 in accordance with one embodiment of the present invention, and the recess 61 of the rotary protrusion connection member 60 and the stationary protrusion insertion recess 42 serving as the first recess and the second recess are formed at both sides of the module housing 40. The protrusions 130 and 120 and the recesses 61 and 42 described with reference to FIGS. 4 and 5 and FIGS. 13 to 15 correspond to only one embodiment, and protrusions and recesses for installing the cleaning module 100 in the module housing 40 may be variously arranged.

In the module driving unit 50, the module driving motor 52 is driven and thus rotates the cleaning module 100 installed in the module housing 40. The module driving unit 50 includes the module driving motor 52 which is rotated by power supplied from the outside, the rotary protrusion connection member 60 which rotates the cleaning module 100 by rotation of the module driving motor 52, and at least one gear which transmits rotary force of the module driving motor 52 to the rotary protrusion connection member 60.

The module driving unit 50 in accordance with this embodiment includes a plurality of gears which transmits rotary force of the module driving motor 52 to the rotary protrusion connection member 60. As the gears in accordance with this embodiment, spur gears provided with screw threads on an outer circumferential surface thereof may be used. With reference to FIGS. 11 and 12, the module driving unit 50 in accordance with this embodiment includes a first gear 54 coupled to a rotary shaft of the module driving motor 52, a second gear 55 engaged with the first gear 54 and rotated, a third gear 56 engaged with the second gear 55 and rotated, and a fourth gear 57 engaged with the third gear 56, rotated and thus rotating the rotary protrusion connection member 60. As the gears in accordance with this embodiment, spur gears having a cylindrical shape and provided with screw threads on an outer circumferential surface thereof may be used. The number and shape of the above-described gears correspond to only one embodiment and may be variously modified as long as the gears may perform a function of transmitting rotary force of the module driving motor 52 to the rotary protrusion 130. A rotary shaft 58 of the fourth gear 57 in accordance with this embodiment is connected to the rotary protrusion connection member 60 and, thus, when the fourth gear 57 is rotated, the rotary protrusion connection member 60 may also be rotated.

The rotary protrusion connection member 60 in accordance with this embodiment is connected to the rotary shaft 58 of the fourth gear 57 and is thus rotated together with rotation of the fourth gear 57. The recess 61 to receive the rotary protrusion 130 of the cleaning module 100, which will be described later, is formed on the rotary protrusion connection member 60. The recess 61 formed on the rotary protrusion connection member 60 has a shape corresponding to the outer circumference of the rotary protrusion 130.

The module driving unit 50 in accordance with this embodiment includes a gear cabinet 59 which covers the gears 54, 55, 56 and 57. The gears 54, 55, 56 and 57 are arranged within the gear cabinet 59. The rotary protrusion connection member 60 is arranged at the outside of the gear cabinet 59 and, in order to facilitate effective rotation, a bearing is arranged between the gear cabinet 59 and the rotary protrusion connection member 60.

The cleaning module 100 in accordance with one embodiment of the present invention is connected to the module driving unit 50 and is rotated within the module housing 40. The cleaning module 100 may move the robot cleaner 10 or wipe a floor surface when the robot cleaner 10 is moved, through the module driving unit 50. The cleaning module 10 is arranged so as to be detachably attached to the module housing 40. The cleaning module 100 is rotated about a rotary shaft thereof extending in a direction horizontal to a ground surface. The cleaning module 100 is rotated about the rotary shaft thereof extending in a direction parallel to the arrangement direction of a pair of spinning mops.

The cleaning module 100 includes the rotational member 110 rotated about the rotary shaft thereof extending in the horizontal direction, one end of the cleaning module 100 is fixedly connected to the rotational member 110, and the other end of the cleaning module 100 is rotatably connected to the rotational member 110. The rotary protrusion 130 fixedly connected to one side of the rotational member 110 is arranged at one end of the cleaning module 100 in accordance with one embodiment of the present invention, and the stationary protrusion 120 rotatably connected to the other side of the rotational member 110 is arranged at the other end of the cleaning module 100.

The cleaning module 100 includes the rotational member 110 rotated within the module housing 40, the rotary protrusion 130 arranged at one side of the rotational member 110 and connected to the module driving unit 50, and the stationary protrusion 120 arranged at the other side of the rotational member 110 and supporting rotation of the rotational member 110. In accordance with this embodiment, the outer circumferential surface of the rotary protrusion 130 forms a polygonal shape having m corners, the outer circumferential surface of the stationary protrusion 120 forms a polygonal shape having n corners, and m is a natural number which is less than n. With reference to FIGS. 13 and 14, m may be 4 and n may be 6. However, the numbers m and n correspond to only one embodiment and may be variously modified as long as the number m is less than the number n. If the number of sides of the polygonal shape of the stationary protrusion 120 is increased, the polygonal shape becomes closer to a circle and thus the stationary protrusion 120 is easily installed on the main body 20.

The cleaning module 100 in accordance with this embodiment includes the rotational member 110 connected to the module driving unit 50 and rotated, and a cleaning member 140 arranged along the circumferential surface of the rotational member 110 and contacting a floor surface. The cleaning member 140 in accordance with this embodiment may surround the outer circumference of the rotational member 110 and use a dustcloth to wipe the floor. Further, the cleaning member 140 may use a brush to sweep the floor. The cleaning module 100 in accordance with this embodiment may be used as a rolling mop which may move the robot cleaner 10 or sweep the floor through rotation of the rotational member 110.

The rotational member 110 in accordance with this embodiment has a cylindrical shape. The cleaning member 140 is arranged along the circumferential surface of the rotational member 110, the rotary protrusion 130 is arranged at one side of the rotational member 110 except for the outer circumferential surface thereof, and the stationary protrusion 120 is arranged at the other side of the rotational member 110 except for the outer circumferential surface thereof.

The stationary protrusion 120 is arranged on the rotary shaft about which the rotational member 110 is rotated. The stationary protrusion 120 is connected to the rotational member 110 by a bearing and thus does not restrain rotation of the rotational member 110.

The outer circumference of the stationary protrusion 120 has a polygonal shape. The outer circumference of the stationary protrusion 10 is surrounded by the stationary protrusion insertion recess 42 and the coupler 70. The outer circumference of the stationary protrusion 120 is fixed by the stationary protrusion insertion recess 42 and the coupler 70. With reference to FIG. 15, the outer circumference of the stationary protrusion 120 in accordance with this embodiment has a hexagonal column shape, but such a shape is only one embodiment and may thus be variously modified as long as the stationary protrusion 120 may be fixed in the module housing 40.

The rotary protrusion 130 transmits rotary force of the module driving unit 50 to the rotational member 110. When the rotary protrusion connection member 60 connected to the module driving unit 50 is rotated, the rotary protrusion 130 is rotated together with rotation of the rotational member 110. With reference to FIGS. 16A to 16C, the outer circumference of the rotary protrusion 130 has a polygonal shape. The outer circumference of the rotary protrusion 130 is inserted into the recess 61 formed on the rotary protrusion connection member 60. The outer circumference of rotary protrusion 130 in accordance with this embodiment has a square column shape, but such a shape is only one embodiment and may thus be variously modified as long as the rotary protrusion 130 may be fixed to the recess 61 formed on the rotary protrusion connection member 60.

The cleaning member 140 is arranged along the circumferential surface of the rotational member 110 of the cleaning module 100. The cleaning member 140 is rotated together with rotation of the rotational member 110 by operation of the module driving unit 50 of the rotational member 110. The cleaning module 100 in accordance with this embodiment may move the main body 20 by operation of the module driving unit 50. Further, the cleaning module 100 in accordance with this embodiment may wipe the floor surface by operation of the module driving unit 50.

The cleaning member 140 may be arranged so as to be detachably attached to the rotational member 110 and, when the cleaning member 140 is attached to the rotational member 110, the cleaning member 140 may be fixed to the rotational member 110 by separate fixing means. Further, the cleaning member 140 may be formed integrally with the rotational member 110.

The robot cleaner 10 in accordance with this embodiment further includes the coupler 70 which is inserted into the stationary protrusion insertion recess 42 and fixes the stationary protrusion 120. The coupler 70 is inserted into the open lower portion of the stationary protrusion insertion recess 42. The coupler 70 contacts the lower portion of the stationary protrusion 120 and the distal end of the stationary protrusion 120. The coupler 70 together with the stationary protrusion insertion recess 42 fixes the stationary protrusion 120.

The coupler 70 includes a stationary protrusion coupling part 72 contacting the lower portion of the stationary protrusion 120, and an insertion recess fastening part 74 fastened to the stationary protrusion insertion recess 42. The insertion recess fastening part 74 may be fastened to the stationary protrusion insertion recess 42 by fastening means, such as bolts, etc.

The stationary protrusion coupling part 72 contacts the lower portion of the stationary protrusion 120 and the distal end of the stationary protrusion 120. The stationary protrusion coupling part 72 has a shape corresponding to a lower portion of the outer circumference of the stationary protrusion 120. The stationary protrusion coupling part 72 may be divided into a lower fixing part 72a contacting the lower portion of the stationary protrusion 120 and a side fixing part 72b contacting the distal end of the stationary protrusion 120. The stationary protrusion insertion recess 42 and the coupler 70 in accordance with this embodiment are coupled to each other and thus form a recess into which the stationary protrusion 120 having a hexagonal column shape is inserted.

Hereinafter, a process of installing the cleaning module 100 in accordance with this embodiment on the main body 20 of the robot cleaner 10 will be described with reference to FIGS. 16A to 17C With reference to FIGS. 16A and 17A, in a state in which the cleaning module 100 is not installed, the module housing 40 in accordance with this embodiment has a shape corresponding to the shape of the outer circumference of the cleaning module 100, and the stationary protrusion insertion recess 42 has a size greater than the size of the stationary protrusion 120 of the cleaning module 100. Therefore, even if the cleaning module 100 is installed in the module housing 40, as exemplarily shown in FIGS. 16B and 17B, the stationary protrusion insertion recess 42, into which the stationary protrusion 120 is inserted, has the clearance 43 outside the stationary protrusion 120. Such a structure allows the cleaning module 100 to be easily installed in the module housing 40.

With reference to FIGS. 16B and 17B, in a state in which the cleaning module 100 alone is installed in the module housing 40, the stationary protrusion 120 formed at one side of the cleaning module 100 in accordance with this embodiment contacts the upper surface of the stationary protrusion insertion recess 42 formed on one side surface 46a of the module housing 40. The rotary protrusion 130 formed at the other side of the cleaning module 100 is engaged with the rotary protrusion connection member 60 arranged on the other side surface 46b of the module housing 40. In this case, the lower portion of the stationary protrusion 120 is not fixed and may be exposed within the stationary protrusion insertion recess 42.

With reference to FIGS. 16C and 17C, in a state in which the cleaning module 100 and the coupler 70 are installed in the module housing 40, the cleaning module 100 in accordance with this embodiment is stably fixed to the module housing 40. Therefore, when the stationary protrusion connection member 60 is operated by the module driving motor 52, the cleaning module 100 is rotated. Here, the stationary protrusion 120 is supported by the coupler 70 and the stationary protrusion insertion recess 42 so that the cleaning module 100 may be stably rotated.

Figure 18:
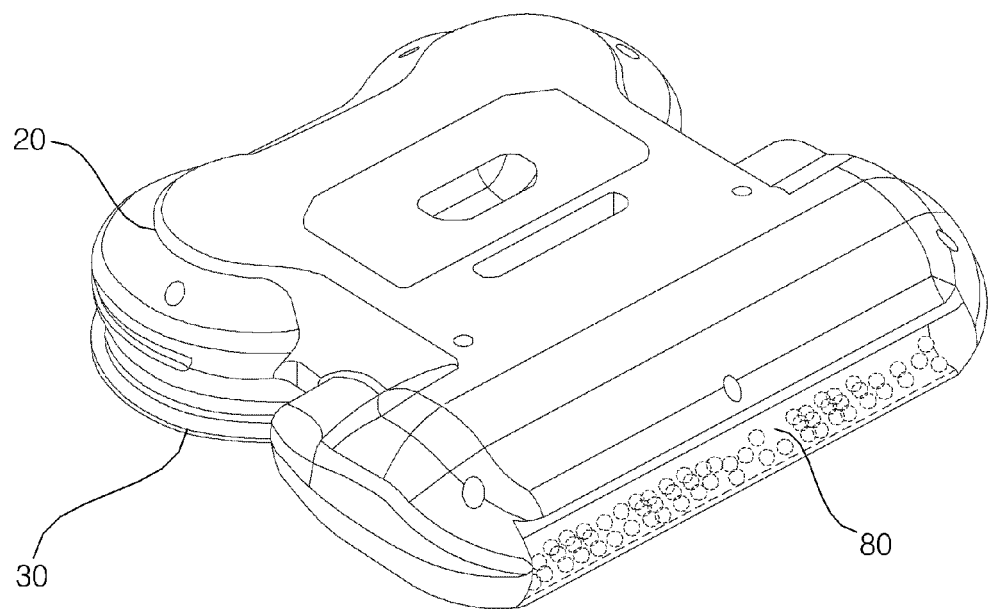
FIG. 18 is a perspective view of a robot cleaner including a dust pocket in accordance with another embodiment of the present invention.
Figure 19:
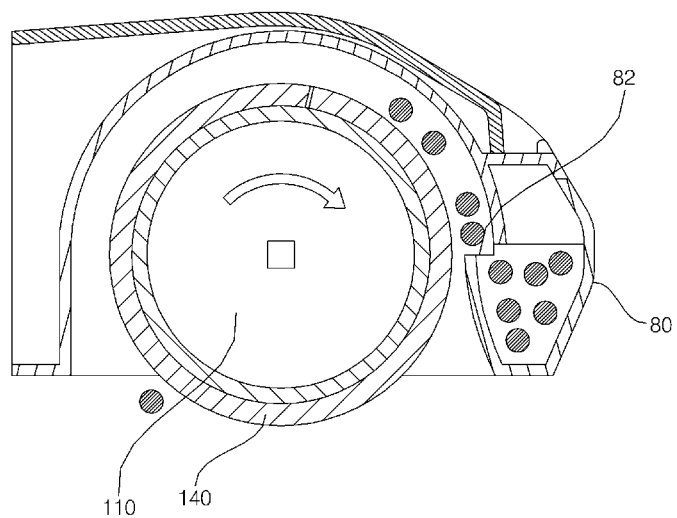
FIG. 19 is a view illustrating arrangement of the dust pocket of the robot cleaner in accordance with the embodiment of the present invention.
Figure 20:
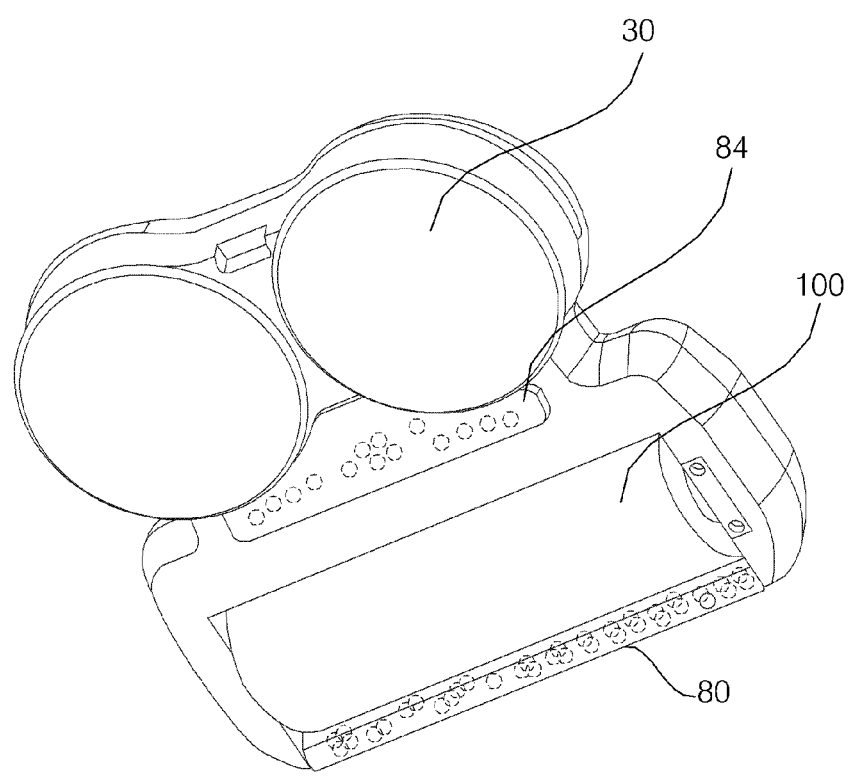
FIG. 20 is a perspective bottom view of the robot cleaner including the dust pocket and a foreign substance pocket in accordance with the embodiment of the present invention.
Figure 21:
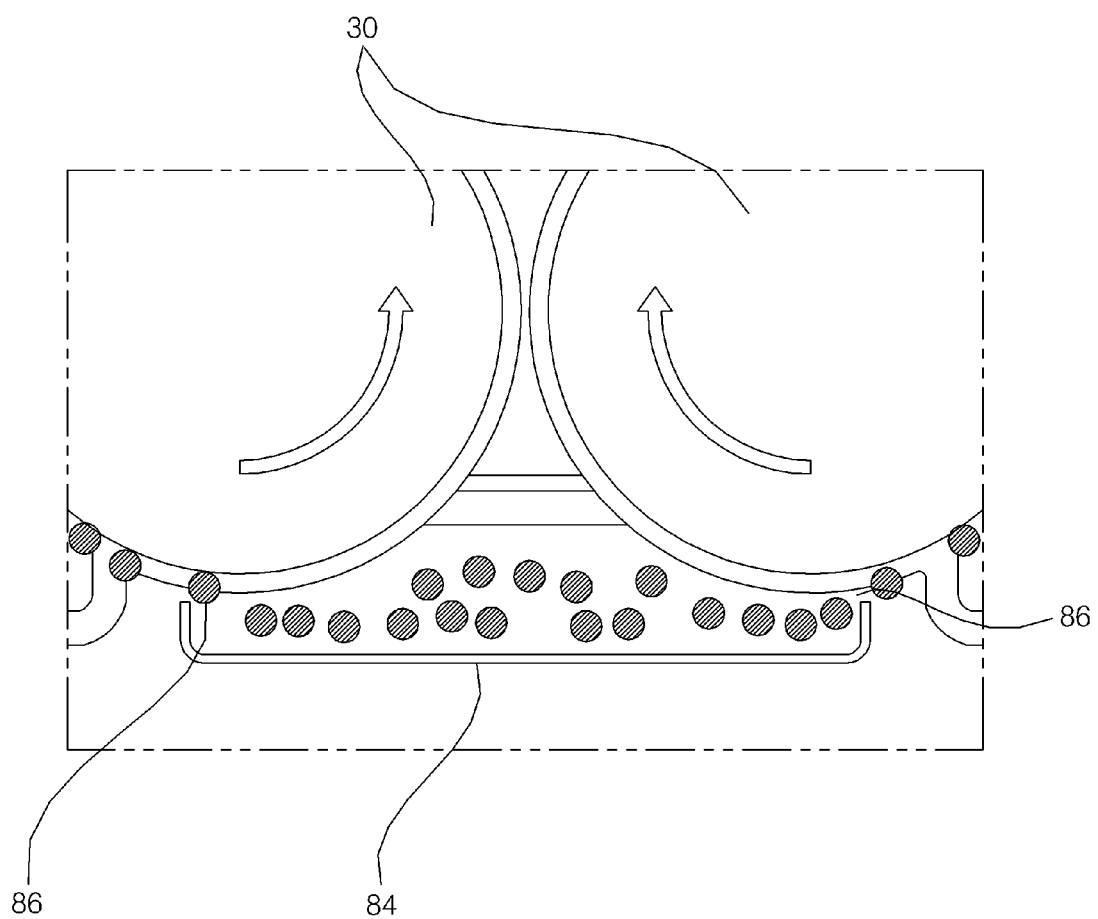
FIG. 21 is a view illustrating arrangement of the foreign substance pocket of FIG. 20.

FIG. 18 is a perspective view of a robot cleaner including a dust pocket in accordance with another embodiment of the present invention. FIG. 19 is a view illustrating arrangement of the dust pocket of the robot cleaner in accordance with the embodiment of the present invention. FIG. 20 is a perspective bottom view of the robot cleaner including the dust pocket and a foreign substance pocket in accordance with the embodiment of the present invention. FIG. 21 is a view illustrating arrangement of the foreign substance pocket of FIG. 20.

Hereinafter, a dust pocket in accordance with this embodiment will be described with reference to FIGS. 18 to 21.

A robot cleaner 10 in accordance with this embodiment may further include a dust pocket 80 which contains foreign substances moved by a cleaning member 140 of a cleaning module 100. In the following description, foreign substances mean dust, contaminants, etc. which are attached to the outer surface of the cleaning member 140 by rotation of the cleaning module 100 or moved by rotary force of the cleaning member 140 and contained in the dust pocket 80. The dust pocket 80 is arranged at one end of a module housing 40 extending in a direction parallel to a rotary shaft of the cleaning module 100. The dust pocket 80 is arranged at a side of the cleaning module 100 in the opposite direction to the moving direction of the robot cleaner 100. The dust pocket 80 may be arranged so as to be detachably attached to one side of the robot cleaner 10.

The dust pocket 80 includes an opening 82 formed at one side thereof so that foreign substances attached to the cleaning member 140 are introduced into the dust pocket 80 through the opening 82. The opening 82 protrudes toward the cleaning module 100 within the module housing 40. The opening 82 is open in the upward direction within the module housing 40.

One side of a portion of the dust pocket 80 forming the opening 82 may contact the outer circumference of the cleaning module 100. Therefore, by rotation of the cleaning module 100, the outer circumference of the cleaning module 100 may contact the side of the dust pocket 80 and, thus, foreign substances may be introduced into the dust pocket 80.

The robot cleaner 10 in accordance with this embodiment uses a pair of spinning mops which contacts a floor and is rotated to wipe the floor, as moving units 30. The robot cleaner 10 in accordance with this embodiment may further include a foreign substance pocket 84 which removes dust bunnies attached to the spinning mops serving as the moving units 30.

The foreign substance pocket 84 is arranged between the spinning mops. The foreign substance pocket 84 is arranged in a rear portion of a central area between the spinning mops in the moving direction of the robot cleaner 10. The foreign substance pocket 84 is arranged between the spinning mops so as to be detachably attached to a main body 20. The foreign substance pocket 84 includes two openings 86 through which foreign substances attached to the outer circumferences of the spinning mops are introduced into the foreign substance pocket 84.

The openings 86 of the foreign substance pocket 84 are formed at both ends, i.e., left and right ends, of the foreign substance pocket 84 so as to be open toward the adjacent spinning mops.

Figure 22:
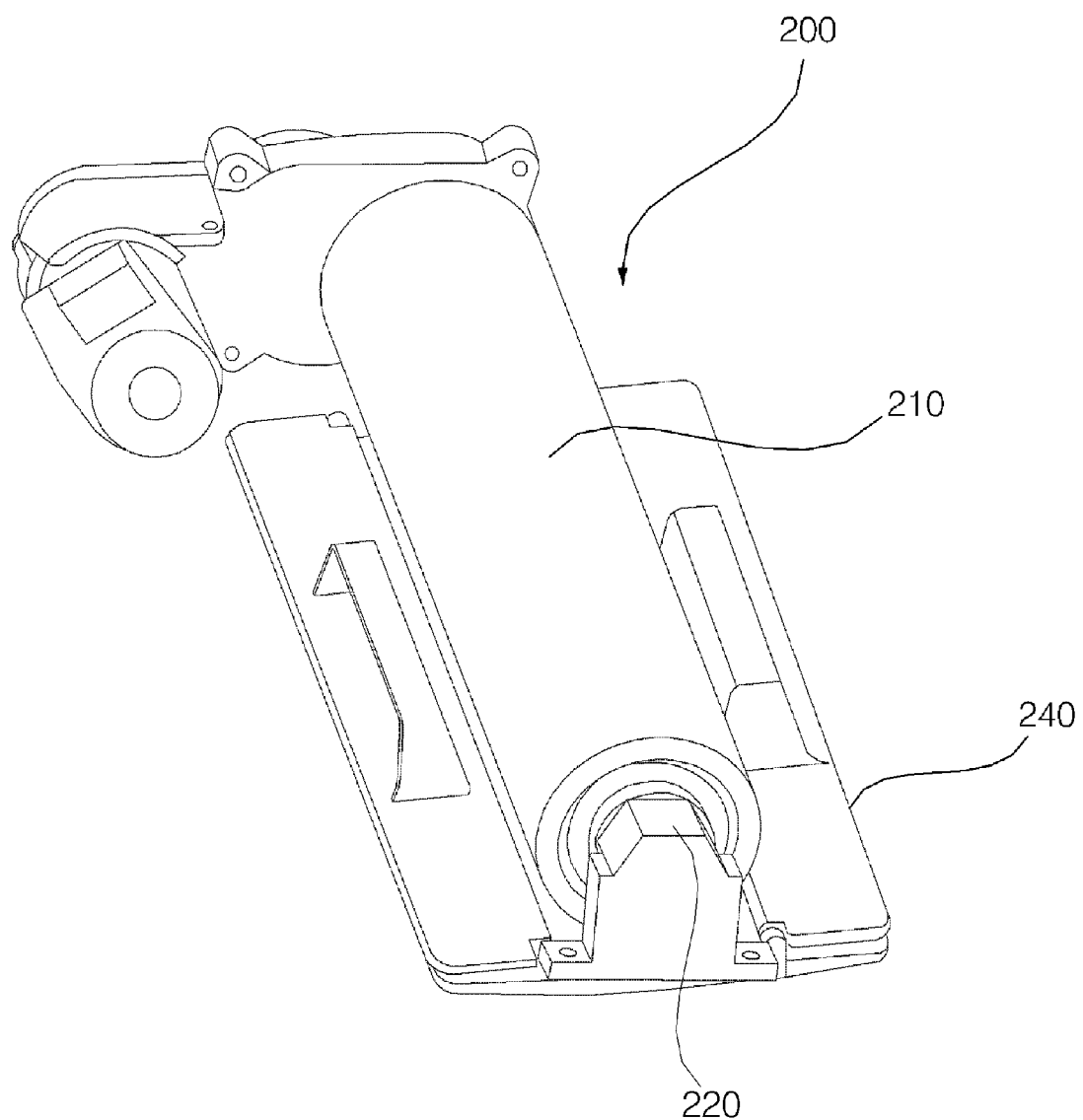
FIG. 22 is a view illustrating a cleaning module, a module driving unit and a coupler in accordance with yet another embodiment of the present invention.
Figure 23:
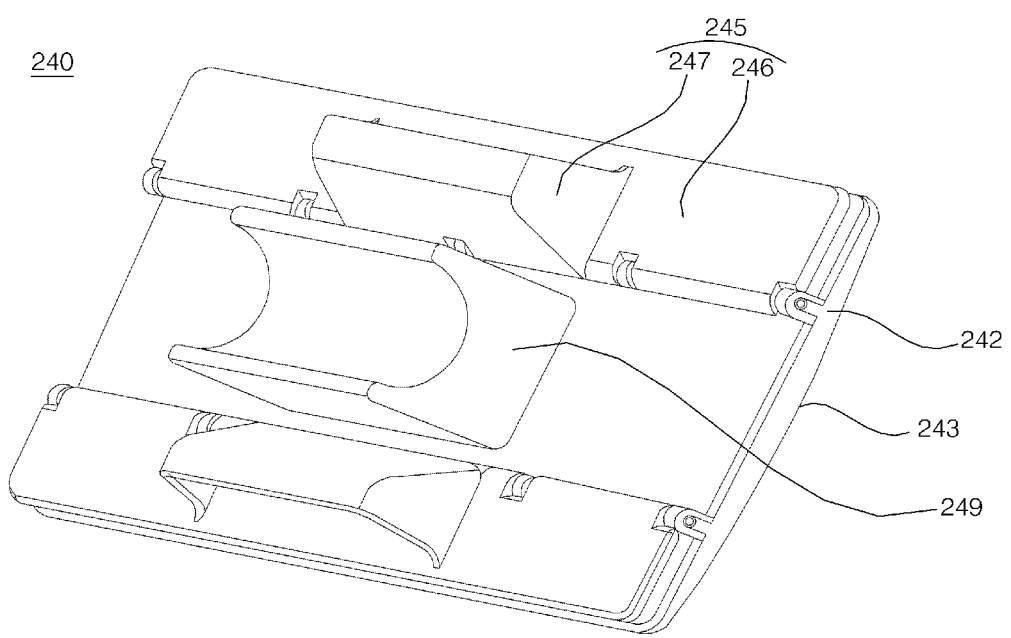
FIG. 23 is a view illustrating a dustcloth tilting member of the cleaning module in accordance with the embodiment of the present invention.
Figure 24:
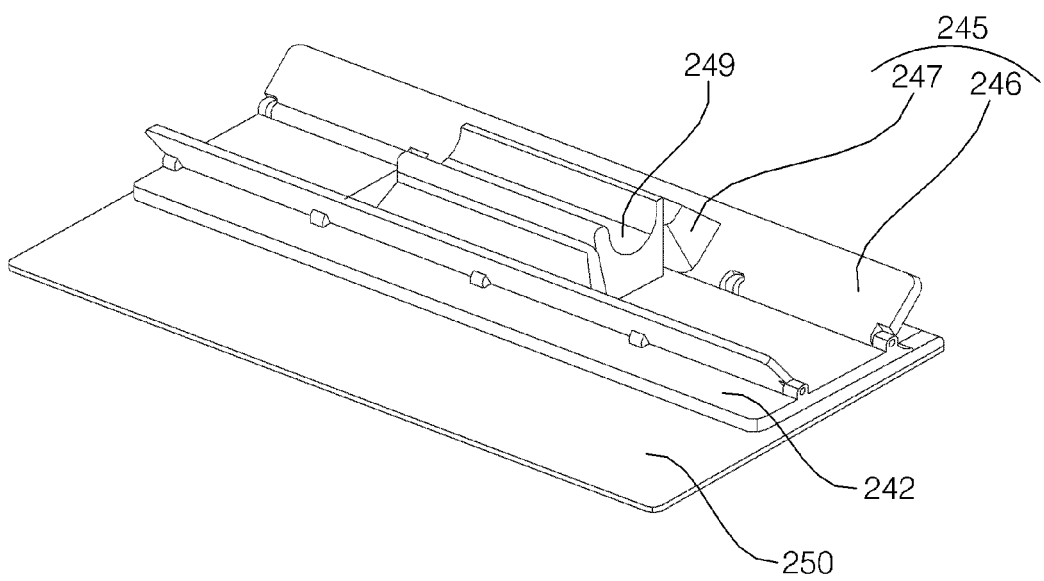
FIG. 24 is a view illustrating a method of installing a dustcloth on the dustcloth tilting member of the cleaning module in accordance with the embodiment of the present invention.
Figure 25:
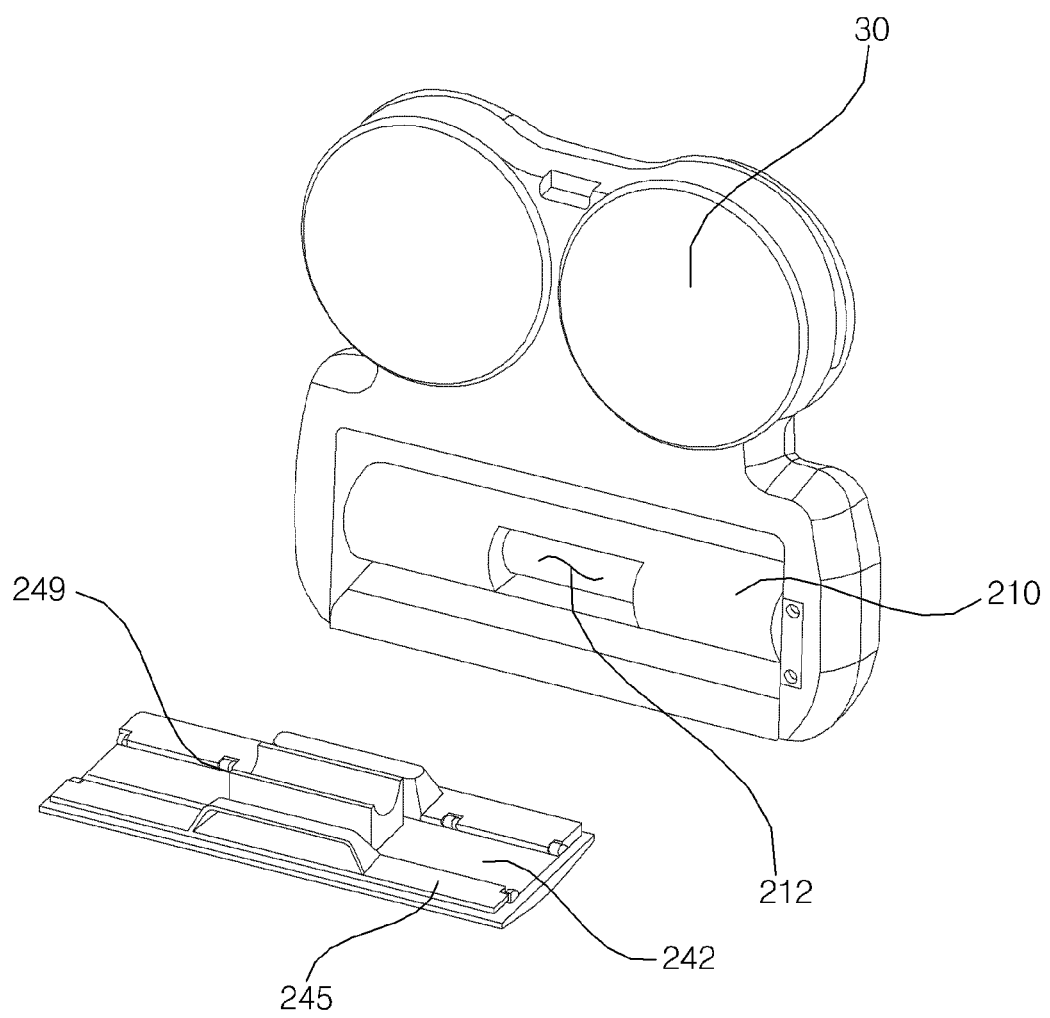
FIG. 25 is a view illustrating one example of installing of the dustcloth tilting member of the cleaning module in accordance with the embodiment of the present invention on a rotational member.

FIG. 22 is a view illustrating a cleaning module, a module driving unit and a coupler in accordance with yet another embodiment of the present invention. FIG. 23 is a view illustrating a dustcloth tilting member of the cleaning module in accordance with the embodiment of the present invention. FIG. 24 is a view illustrating a method of installing a dustcloth on the dustcloth tilting member of the cleaning module in accordance with the embodiment of the present invention. FIG. 25 is a view illustrating one example of installing of the dustcloth tilting member of the cleaning module in accordance with the embodiment of the present invention on a rotational member.

Hereinafter, a cleaning module in accordance with yet another embodiment of the present invention will be described with reference to FIGS. 22 to 25.

A cleaning module 200 in accordance with this embodiment may wipe a floor surface when a robot cleaner 10 is moved. The cleaning module 200 in accordance with this embodiment forms a tilt angle from the floor surface so that a part of the cleaning module 200 contacts the floor surface. The tilt angle of the cleaning module 200 from the floor surface is varied by a module driving unit 50. The cleaning module 200 is arranged so as to be detachably attached to a module housing 40.

With reference to FIG. 22, the cleaning module 200 in accordance with this embodiment includes a dustcloth tilting member 240 to which a dustcloth 250 to wipe a floor is attached, a rotary protrusion (not shown) connected to the module driving unit 50, a rotational member 210 connected to the rotary protrusion (not shown) and adjusting a tilt angle of the dustcloth tilting member 240, and a stationary protrusion 220 which fixes arrangement of the rotational member 210 in the module housing 40.

In the cleaning module 200 in accordance with this embodiment, the dustcloth tilting member 240 is arranged so as to be tilted in the moving direction of the robot cleaner 10 through rotation of the rotational member 210 and thus wipes a floor surface. The dustcloth tilting member 240 wipes the floor surface using the dustcloth 250 attached and fixed to a tilting plate 242. As the dustcloth 250 attached to the dustcloth tilting member 240, a disposable dustcloth or a general dustcloth may be used.

The dustcloth tilting member 240 includes the tilting plate 242 to which the dustcloth 250 is attached, dustcloth fixing units 245 which fix the dustcloth 250 to the tilting plate 242, and a coupling part 249 which protrudes from one side of the tilting plate 242 and connects the tilting plate 242 to the rotational member 210.

The dustcloth 250 is attached to the tilting plate 242. The dustcloth 250 to wipe the floor is arranged on one surface of the tilting plate 242, and the dustcloth fixing units 245 to fix the dustcloth 250 are arranged on the other surface of the tilting plate 242. The coupling part 249 connecting the tilting plate 242 to the rotational member 210 is arranged on the other surface of the tilting plate 242. The surface of the tilting plate 242 on which the dustcloth 250 is arranged forms a curved surface part 243 which is convex toward the outside of the tilting plate 242.

A pair of the dustcloth fixing units 245 to fix the dustcloth 250 arranged on one surface of the tilting plate 242 is arranged on the other surface of the tilting plate 242. The dustcloth fixing units 245 are hinged to the other surface of the tilting plate 242. A pair of the dustcloth fixing units 245 is arranged at both ends of the other surface of the tilting plate 242.

The dustcloth fixing unit 245 includes a dustcloth fixing plate 246 hinged to the tilting plate 242, and a handle 247 which is rotated about a hinge shaft and thus lifts the dustcloth fixing plate 246. In a state in which separate pressure is not applied to the handle 247, the dustcloth fixing plate 246 contacts the tilting plate 242.

A part of the dustcloth 250 is arranged between the dustcloth fixing plate 246 and the tilting plate 242 and is fixed. With reference to FIG. 24, a user applies force to the handle 247 so as to space the dustcloth fixing plate 246 apart from the tilting plate 242, inserts one end of the dustcloth 250 into a space between the tilting plate 242 and the dustcloth fixing plate 246, and then releases the force from the handle 247, the dustcloth 250 is fixed to the tilting plate 242.

The coupling part 249 protrudes from the other surface of the tilting plate 242. The coupling part 249 is connected to the circumferential surface of the rotational member 210. An end of the coupling part 249 is inserted into a coupling groove 212 formed at one side of the rotational member 210.

The end of the coupling part 249 in accordance with this embodiment has a shape, a central portion of which is concave and both sides of which protrude. The coupling groove 212 formed at one side of the rotational member 210 has a shape corresponding to the shape of the end of the coupling part 249. The shape of the end of the coupling part 249 may be variously modified as long as the coupling part 249 performs functions of fixing the dustcloth tilting member 240 to the rotational member 210 and rotating the dustcloth tilting member 240 by rotation of the rotational member 210.

The coupling part 249 may be provided with fastening protrusions formed at one side thereof or both sides thereof so as to be fixed to the coupling grooves 212 of the rotational member 210. The fastening protrusions are inserted into fastening recesses (not shown) formed in the coupling groove 212 of the rotational member 210. The end of the coupling part 249 is fastened to the rotational member 210 by inserting the fastening protrusions into the coupling groove 212 of the rotational member 210.

The dustcloth tilting member 240 in accordance with this embodiment may adjust a direction of the tilting plate 242 facing a floor surface or an angle of the tilting plate 242 from the floor surface by adjusting the module driving motor 52.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A robot cleaner comprising:
a main body forming an external appearance of the robot cleaner;
a pair of spinning mops provided so as to contact a floor while being rotated in a clockwise direction or a counterclockwise direction as viewed from the top, and moving the main body;
a cleaning module provided so as to contact the floor, arranged at one side of the main body and rotated;
a module driving unit arranged in the main body and rotating the cleaning module; and
a dust pocket configured to contain foreign substances moved by the cleaning module.
2. The robot cleaner according to claim 1, wherein the cleaning module comprises:
a rotational member connected to the module driving unit so as to be rotated; and
a cleaning member arranged along an outer circumference of the rotational member and contacting a floor surface.
3. The robot cleaner according to claim 2, wherein the dust pocket comprises an opening through which foreign substances attached to an outer circumference of the cleaning member is introduced into the dust pocket,
wherein the opening is open in the upward direction within a module housing of the main body.
4. The robot cleaner according to claim 1, further comprising a foreign substance pocket configured to remove foreign substances attached to outer circumferences of the pair of spinning mops.
5. The robot cleaner according to claim 1, wherein:
the cleaning module is arranged so as to be detachably attached to the side of the main body; and the robot cleaner further comprises a coupler configured to fix the cleaning module installed in the main body.

6. The robot cleaner according to claim 1, wherein the cleaning module comprises:
a rotational member rotated about a rotary shaft extending in the horizontal direction;
a rotary protrusion fixedly connected to one side of the rotational member and connected to the module driving unit; and
a stationary protrusion rotatably connected to the other side of the rotational member and supporting rotation of the rotational member.

7. The robot cleaner according to claim 6, wherein:
the main body forms a module housing having an inner space so as to receive a part of the cleaning module;
a stationary protrusion insertion recess to receive the stationary protrusion inserted thereto is formed at one side of the module housing; and
the robot cleaner further comprises a coupler configured to fix the stationary protrusion inserted into the stationary protrusion insertion recess.

8. The robot cleaner according to claim 7, wherein:
an outer circumference of the stationary protrusion has a polygonal shape; and
the stationary protrusion insertion recess forms a hole having a polygonal structure corresponding to the shape of the stationary protrusion by coupling to the coupler.

9. The robot cleaner according to claim 6, wherein:
an outer circumferential surface of the rotary protrusion forms a polygonal shape having m corners;
an outer circumferential surface of the stationary protrusion forms a polygonal shape having n corners; and
m is a natural number being less than n.

10. The robot cleaner according to claim 1, wherein the module driving unit comprises:
a module driving motor configured to generate rotary force;
a rotary protrusion connection member configured to rotate the cleaning module by rotation of the module driving motor; and
at least one gear configured to transmit the rotary force of the module driving motor to the rotary protrusion connection member.

11. The robot cleaner according to claim 1, wherein the cleaning module is rotated about a rotary shaft extending in the horizontal direction.

12. The robot cleaner according to claim 1, wherein the cleaning module is rotated about a rotary shaft extending in a direction being parallel to an arrangement direction of the pair of spinning mops.

* * * * *